(12) United States Patent  
Jigamian

(10) Patent No.: US 9,004,729 B2  
(45) Date of Patent: Apr. 14, 2015

(54) GUN-MOUNTED SEARCH LIGHT

(71) Applicant: SureFire LLC, Fountain Valley, CA (US)

(72) Inventor: Gregory Z. Jigamian, Temecula, CA (US)

(73) Assignee: SureFire LLC., Fountain Valley, CA (US)

( * ) Notice: Subject to any disclaimer, the term of this patent is extended or adjusted under 35 U.S.C. 154(b) by 57 days.

(21) Appl. No.: 14/049,079

(22) Filed: Oct. 8, 2013

(65) Prior Publication Data

US 2014/0036354 A1 Feb. 6, 2014

Related U.S. Application Data

(63) Continuation-in-part of application No. 13/046,665, filed on Mar. 11, 2011, now Pat. No. 8,613,534.

(51) Int. Cl.
| | |
|---|---|
| *F21V 15/04* | (2006.01) |
| *G02B 7/00* | (2006.01) |
| *F41G 11/00* | (2006.01) |
| *F21V 9/04* | (2006.01) |
| *F41G 1/36* | (2006.01) |

(52) U.S. Cl.  
CPC .............. *G02B 7/006* (2013.01); *F41G 11/003* (2013.01); *F21V 9/04* (2013.01); *F21V 15/04* (2013.01); *F41G 1/36* (2013.01)

(58) Field of Classification Search  
USPC ............ 362/109, 110, 267, 277, 288, 296.01, 362/390, 458; 359/892  
See application file for complete search history.

(56) References Cited

U.S. PATENT DOCUMENTS

2009/0153985 A1* 6/2009 Nagaoka et al. ............... 359/733

* cited by examiner

*Primary Examiner* — Meghan Dunwiddie  
(74) *Attorney, Agent, or Firm* — Daniel L. Dawes; Marcus C. Dawes

(57) ABSTRACT

An internal IR filter assembly for an illuminator has a lamp disposed within a reflector with a face plate. A spring-biased IR filter is shaped as a hollow sleeve telescopically disposed over the lamp. A fixed cylindrical pedestal has one end coupled to the face plate. A sliding cylindrical mount is coupled to the IR filter and telescopically disposed over the fixed pedestal. A gear drive is engaged to a driven gear or hub. A motor is coupled to the gear drive to selectively and reversibly rotate the gear drive. The driven gear is coupled to the sliding cylindrical mount of the IR filter to selectively and reversibly translate the IR filter with respect to the lamp. At least one rod is coupled to the driven gear to prevent the rotation of the driven gear. The rod is slidable within the illuminator but rotationally fixed relative to the illuminator.

22 Claims, 30 Drawing Sheets

GUN-MOUNTED SEARCH LIGHT

RELATED APPLICATIONS

The present application a continuation in part of U.S. patent application Ser. No. 13/046,665, filed on Mar. 11, 2011, which is incorporated herein by reference and to which priority is claimed pursuant to 35 USC 120.

BACKGROUND OF THE INVENTION

1. Field of the Invention

The invention relates to the field of accessories for weapons and in particular to a gun-mounted arc search light.

2. Description of the Prior Art

The HellFighter® target illuminator manufactured by the assignee of the illustrated embodiments of the disclosed invention is designed primarily for use on .50 caliber machine guns. Its shock-isolated 35 W HID lamp has an output of approximately 3,000 lumens and is powered by either two 5590 military batteries or the cigarette lighter adapter. The HellFighter® target illuminator also can be used as a portable, handheld light by detaching it from the T-mount and using the integrated handle.

While the HellFighter® target illuminator is a successfully battle-tested gun-mounted accessory, it is possible to make the HellFighter® target illuminator even more versatile and to improve its performance even more by including the following disclosed improvements in it.

BRIEF SUMMARY OF THE INVENTION

The illustrated embodiments of the invention include an internal IR filter assembly for an illuminator having a lamp disposed within a reflector with a face plate. A spring-biased IR filter is shaped as a hollow sleeve telescopically disposed over the lamp. A fixed cylindrical pedestal has one end coupled to the face plate. A sliding cylindrical mount is coupled to the IR filter and telescopically disposed over the fixed pedestal. A gear drive is engaged to a driven gear or hub. A motor is coupled to the gear drive to selectively and reversibly rotate the gear drive. The driven gear is coupled to the sliding cylindrical mount of the IR filter to selectively and reversibly translate the IR filter with respect to the lamp. At least one rod is coupled to the driven gear to prevent the rotation of the driven gear. The rod is slidable within the illuminator but rotationally fixed relative to the illuminator.

The internal IR filter assembly further includes a plurality of rods coupled to the driven gear to prevent the rotation of the driven gear. Each of the rods is slidable within the illuminator but rotationally fixed relative to the illuminator.

The tripod of rods is coupled to the driven gear to prevent the rotation of the driven gear.

The driven gear has a front disposed toward the reflector and a rear disposed away from the reflector. The tripod of rods is coupled to the cylindrical mount coupled to the IR filter.

The tripod of rods is disposed through the reflector and is coupled to the front of the driven gear to prevent rotation of the driven gear.

In one embodiment the plurality of rods include a first tripod of rods coupled to the rear of the driven gear to prevent the rotation of the driven gear.

The internal IR filter assembly further includes a second tripod of rods coupled to the front of the driven gear.

The front of the driven gear is disposed toward the reflector, the rear of the driven gear is disposed away from the reflector, and the second tripod of rods is coupled to the cylindrical mount coupled to the IR filter.

In one embodiment the second tripod of rods is disposed through corresponding holes defined in the reflector without contacting the reflector.

In another embodiment the second tripod of rods is disposed through corresponding holes defined in the reflector with sliding contact with the reflector to prevent rotation of the driven gear.

The first and second tripods of rods are angularly offset from each other with respect to their coupling to the driven gear.

The illustrated embodiments also include a drive system for an internal IR filter assembly in an illuminator including a gear drive, a driven gear engaged with the gear drive, a motor coupled to the gear drive to selectively and reversibly rotate the gear drive with the driven gear being coupled to the sliding cylindrical mount of the IR filter to selectively and reversibly translate the IR filter within the illuminator, and at least one rod coupled to the driven gear to prevent the rotation of the driven gear. The rod is slidable within the illuminator but rotationally fixed relative to the illuminator.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The improvements included in the illustrated embodiments of the invention include the following.

Manually Manipulated and Storable External IR Filter

Figure 1:
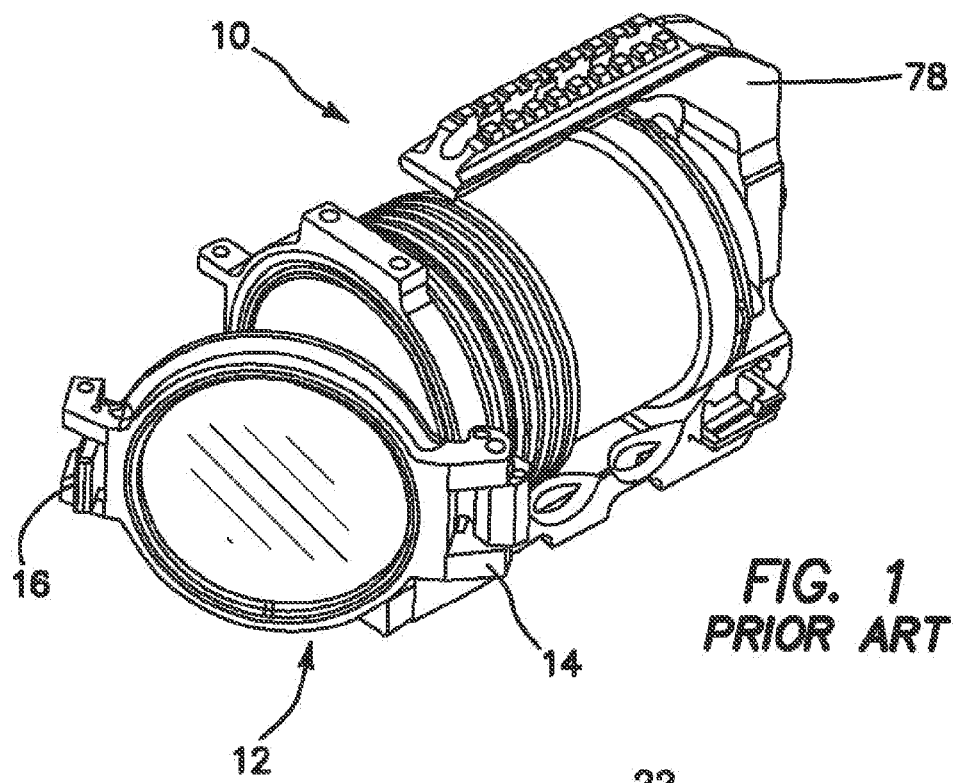
FIG. 1 is a perspective view of the HellFighter® target illuminator.

FIG. 1 is a perspective view of the HellFighter® target illuminator 10 as previously marketed. Illuminator 10 included an IR filter 12 rotatably coupled to the front of illuminator 10 by means of a hinge 14 and secured by an opposing latch 16. When use of filter 12 was not desired, it was unlatched and swung out of the beam, where it remained coupled to the hinge 14. In this position is it exposed to abrasion from exterior debris as well as simply being in the way and/or potentially inadvertently swinging back into the beam as a result of a jarring force, when not intended.

Figure 2:
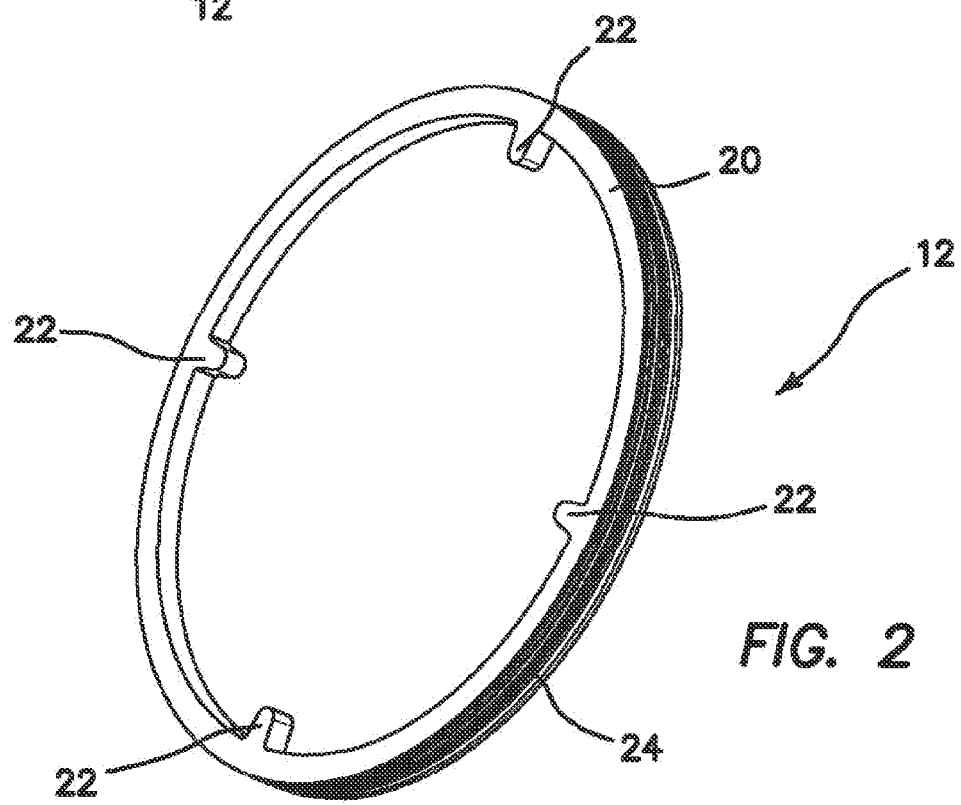
FIG. 2 is a perspective view of an IR filter provided in a separate circular frame provided with a circumferential thread.
Figure 3:
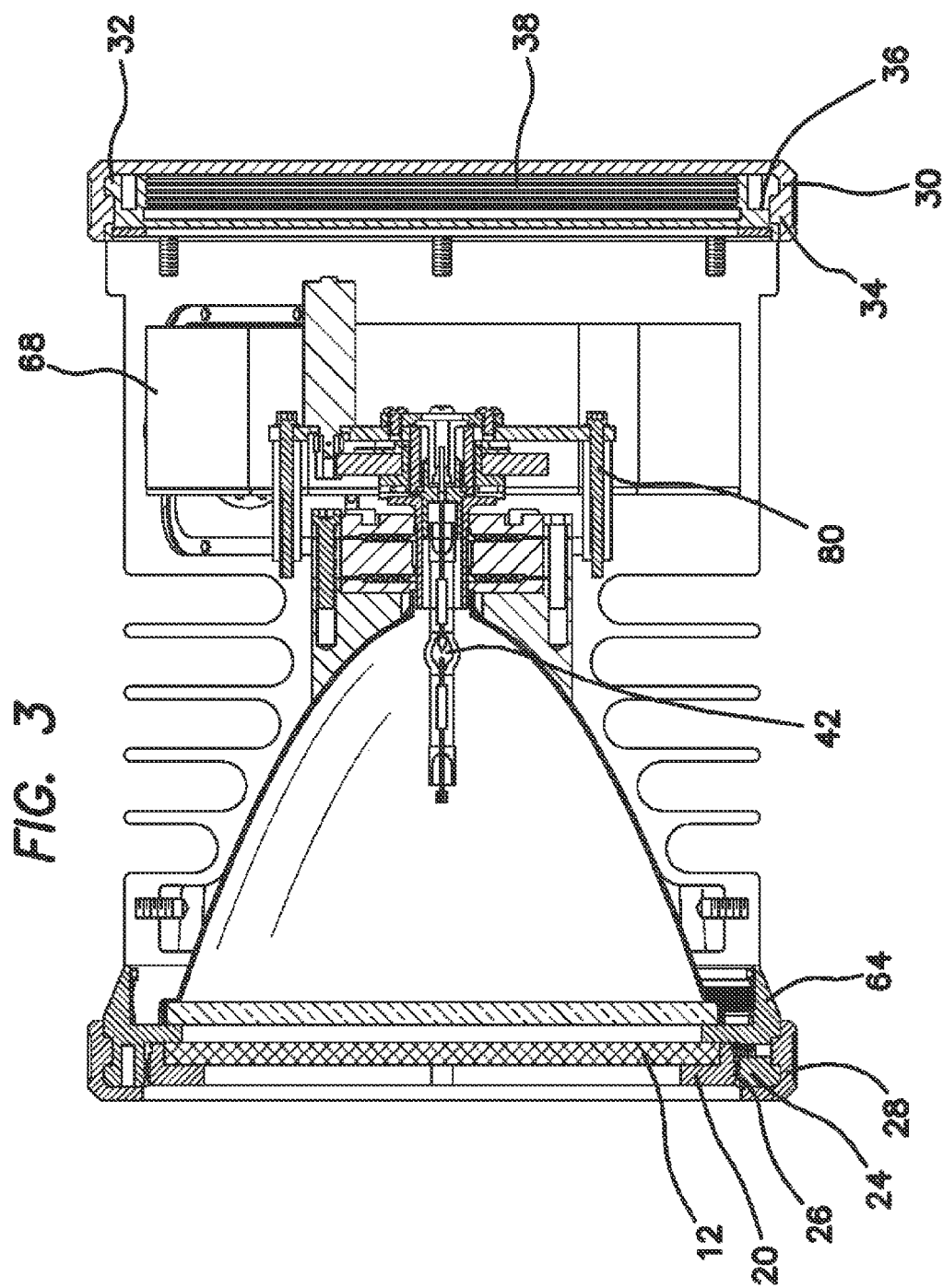
FIG. 3 is a longitudinal side cross-sectional view of the illuminator of the illustrated embodiments.

FIG. 2 is a perspective view of one embodiment of the illustrated invention wherein IR filter 12 is provided in a separate circular frame 20 provided with an circumferential thread 24, which threads into a mating thread 26 defined in the inner edge of front bezel 28 of illuminator 10 as best seen in the cross-sectional view of FIG. 3. At least two and in the illustrated embodiment four radially directed circumferential tabs 22 are integrally extended from frame 20 which allow a manual torque to be applied to frame 20 to manually screw it into and out of bezel 28 in the field. Tabs 22 are positioned in the periphery of the illumination field and therefore do not substantially affect or block the beam. No tools are required in order to be able to apply sufficient torque to IR filter 12 to insert it into position as shown in FIG. 3 or to remove it from bezel 28. A user is able to manually span frame 20 between his fingers and thumb in contact with one or more of tabs 22 and apply the torque needed to install and remove filter 12.

An elastic or rubberized opaque dust cap 30, shown in a rear storage position in FIG. 3, is elastically fitted over front bezel 28 to provide physical protection to front bezel 28 and filter 12 when not in use in those cases where filter 12 is left in the operative configuration. Opaque dust cap 30 also provides a simple means for temporarily blocking the transmission of light from illuminator 10 without the need for turning illuminator 10 off in any circumstance in which such a manipulation is desired or more significantly provides a safety feature for blocking accidental transmission of light if the illuminator 10 were inadvertently turned on during operation.

When filter 12 is not to be used and is manually removed, it can readily be stored in a storage space 38 defined in the rear end of illuminator 10 in a threaded rear bezel 32, shown in the configuration of FIG. 3 as temporarily covered by dust cap 30. Dust cap 30, which elastically engages rear bezel 32 by disposition of an inner circumferential rib 34 into a mating outer circumferential groove 36 defined in rear bezel 32. With cap 30 removed, IR filter 12 is then threaded into the storage space 38 and once fully seated, is recovered by elastic dust cap 30, which provides additional protection from debris and abrasion to the surface of filter 12 when not in use.

Level Driven and Storable Internal IR Filter

Figure 4:
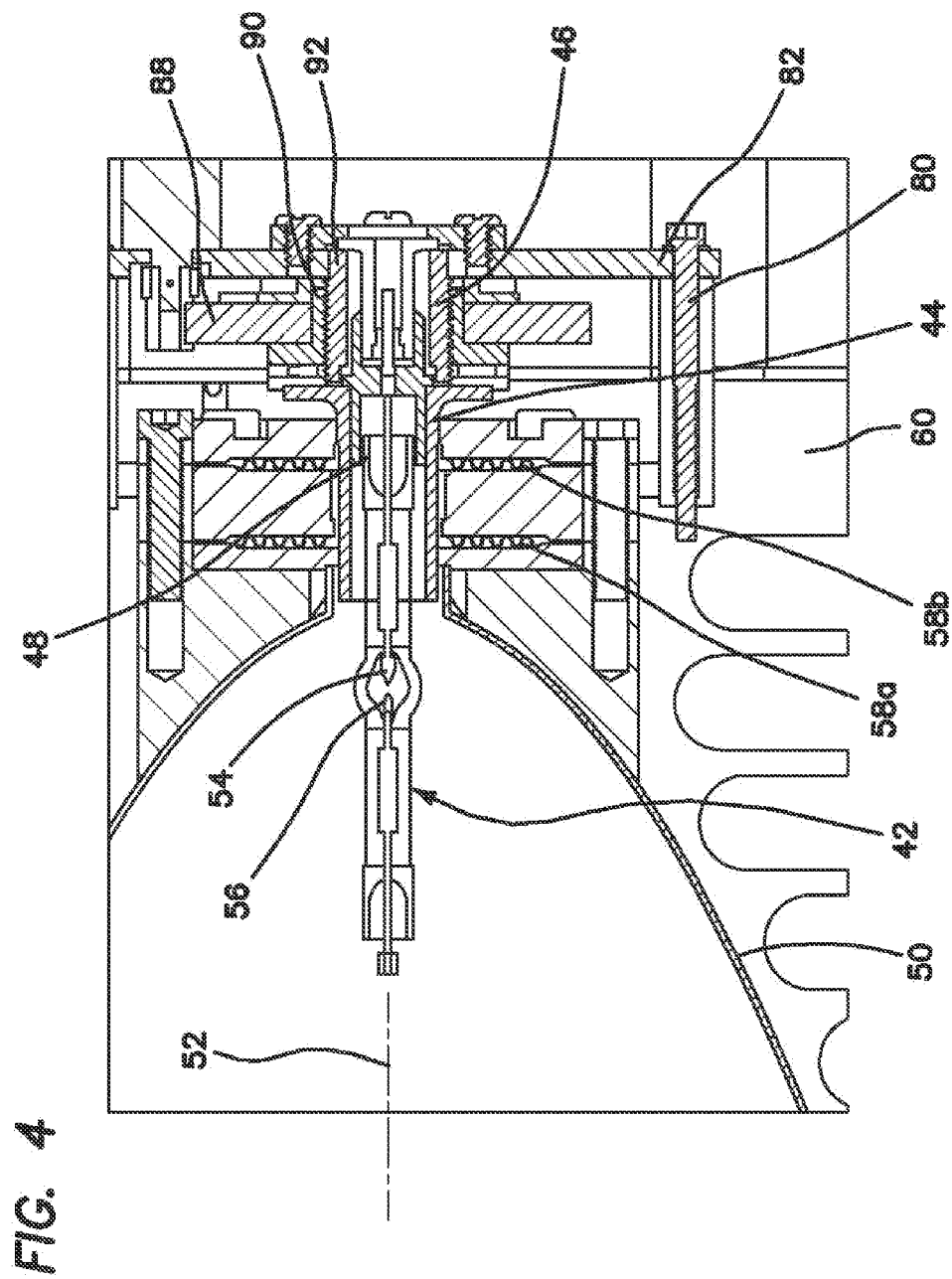
FIG. 4 is a longitudinal side cross-sectional view in enlarged scale of the illuminator of the illustrated embodiments depicting the thrust assembly.
Figure 5:
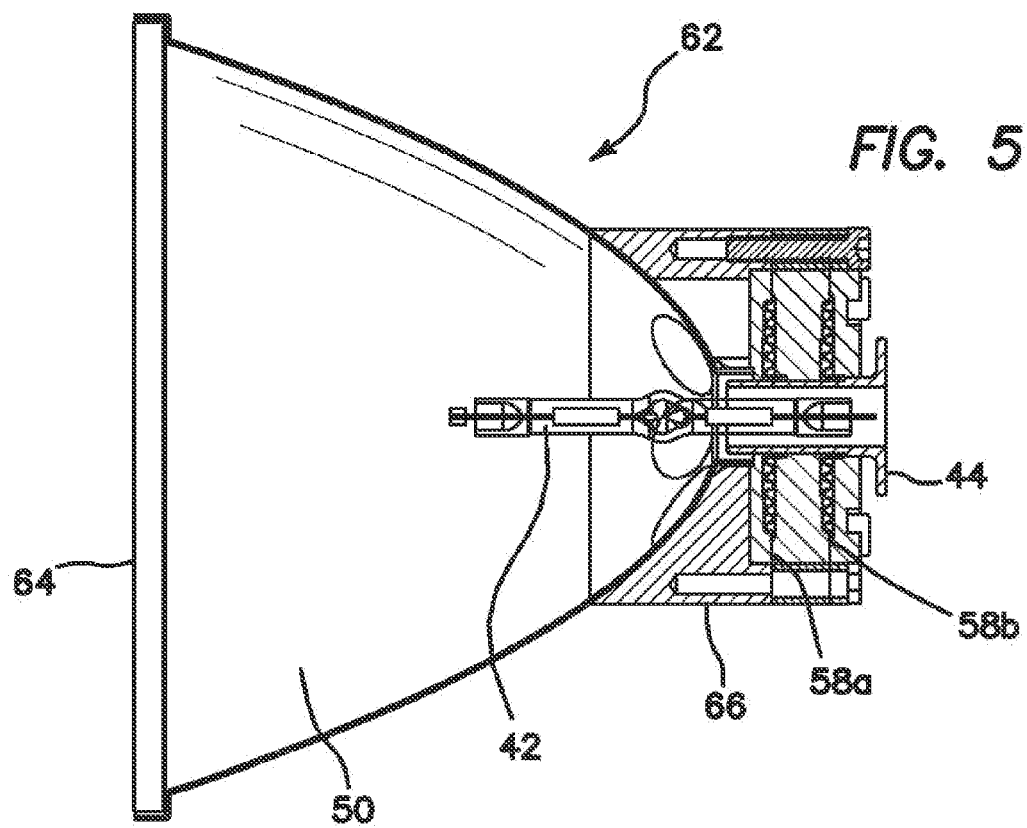
FIG. 5 is a longitudinal side cross-sectional view of the illuminator of the illustrated embodiments depicting the pair of bellows springs which mount the lamp holder.
Figure 29:
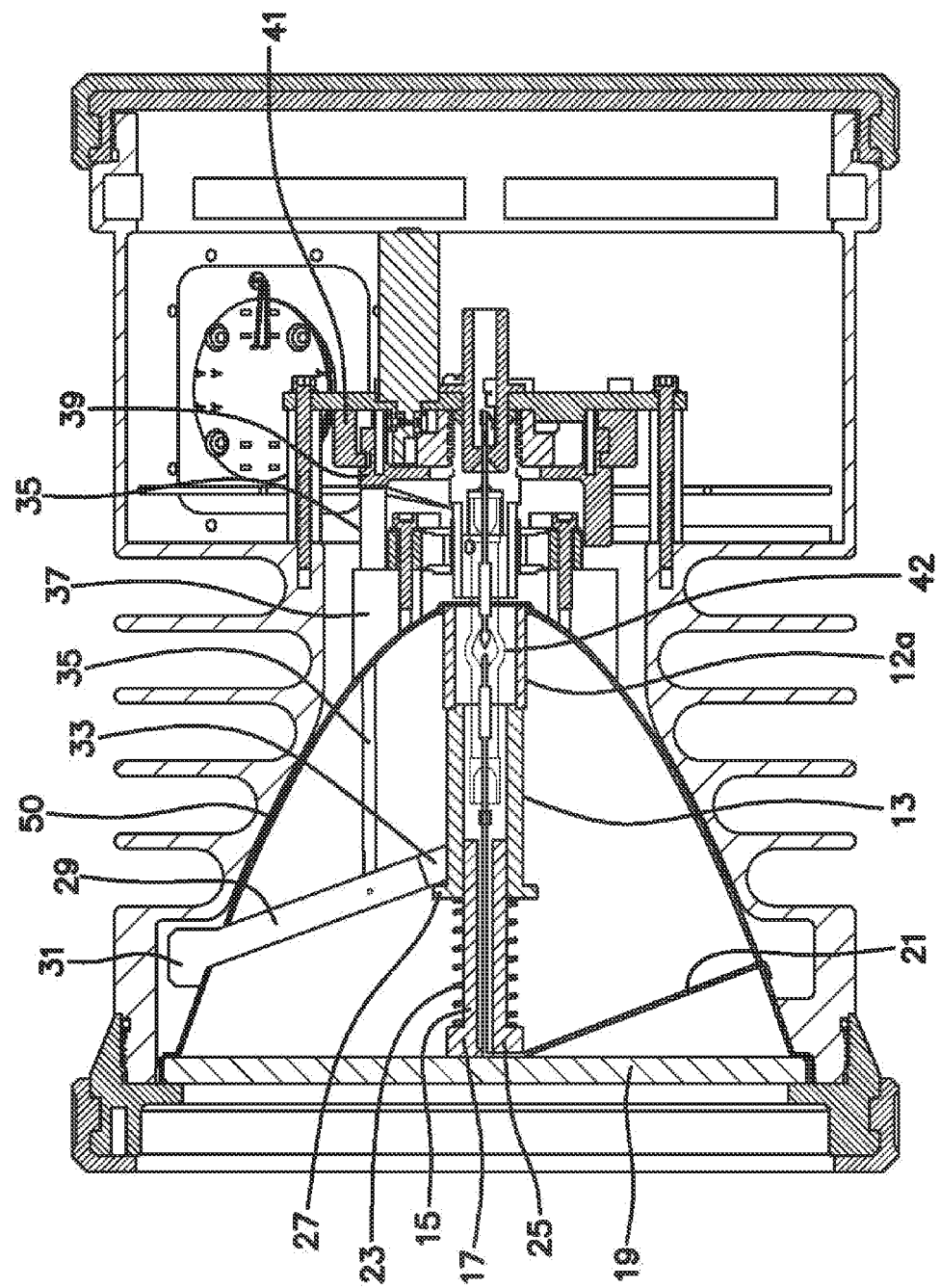
FIG. 29 is a longitudinal side cross-sectional view of another embodiment of the illuminator wherein the IR filter is provided as a telescopic sleeve over the lamp and activated by a level mechanism.

FIG. 29 is a longitudinal side cross-sectional view of another embodiment of the illuminator wherein the IR filter is provided as a telescopic sleeve 12a over the lamp 42. IR sleeve 12a can be manufactured at a fraction of the cost of the bezel mounted IR filter 12. Each of the elements of the embodiment of FIGS. 3-5 is also included in the embodiment of FIG. 29, albeit in some cases modified in form. For example, diaphragms 58a and 58b have been slightly reduced in diameter in the embodiment of FIG. 29, but perform the same function as in FIG. 3. The embodiment of FIG. 29 differs from that of FIG. 3 primarily in that instead of having a bezel mounted IR filter 12, a molded cylindrical IR filter 12a is fixed to the end of a sliding cylindrical mount 13.

Mount 13 is telescopically disposed over a fixed cylindrical pedestal 15, which has its forward or distal end 17 fixed to the center of faceplate 19 of reflector 50. Cylindrical pedestal 15 is aligned with the optical axis 52 of reflector 50 as shown in FIG. 4 and is hollow to permit the disposition of a lamp lead 21 through distal end 17. The opposing end of lead 21 is electrically coupled to grounded metal reflector 50. Sliding cylindrical mount 13 is biased by a spring 23 which is coaxially disposed about pedestal 15 and compressed between a fixed flange 25 of pedestal 15 and a distal flange 27 of cylindrical mount 13. Cylindrical mount 13 is coupled to a thrust lever 29 which has a pivoted end 31 coupled to reflector 50 and a yoke 33 on its opposing end for engaging distal flange 27 of cylindrical mount 13. Thrust lever 29 is rotatably coupled to a drive pin 35 which extends from its pivoted coupling to thrust lever 29 rearwardly within reflector 50 and slidingly extends through a bearing block 37 to contact and ride on a rotating cylindrical cam 39.

Cam 39 is in the form of a cylinder disposed and journaled outside the radius of the mechanism including thrust collar 90 and threaded bushing 92 described above in connection with FIG. 4 which focuses or moves the lamp 42 within reflector 50. The distal end of cam 39 is sloped with respect to the axis of rotation of cam 39 to provide a camming surface which can selectively advance or withdraw drive pin 35 in the longitudinal direction and hence dispose IR filter sleeve 12a over the lamp or IR operation or withdraw it, to allow visible light operation. In other words the distal end of cam 39 is a cylinder which is cut on an angle or otherwise shaped to provide an advancing or withdrawing camming surface bearing against the proximate or rear end of drive pin 35 as cylindrical cam 39 is rotated. Cam 39 is provided with a gear ring 41 on its outer cylindrical surface, which is engaged with a pinion gear driven in turn by a controllable reversible electric motor (not shown).

Figure 8:
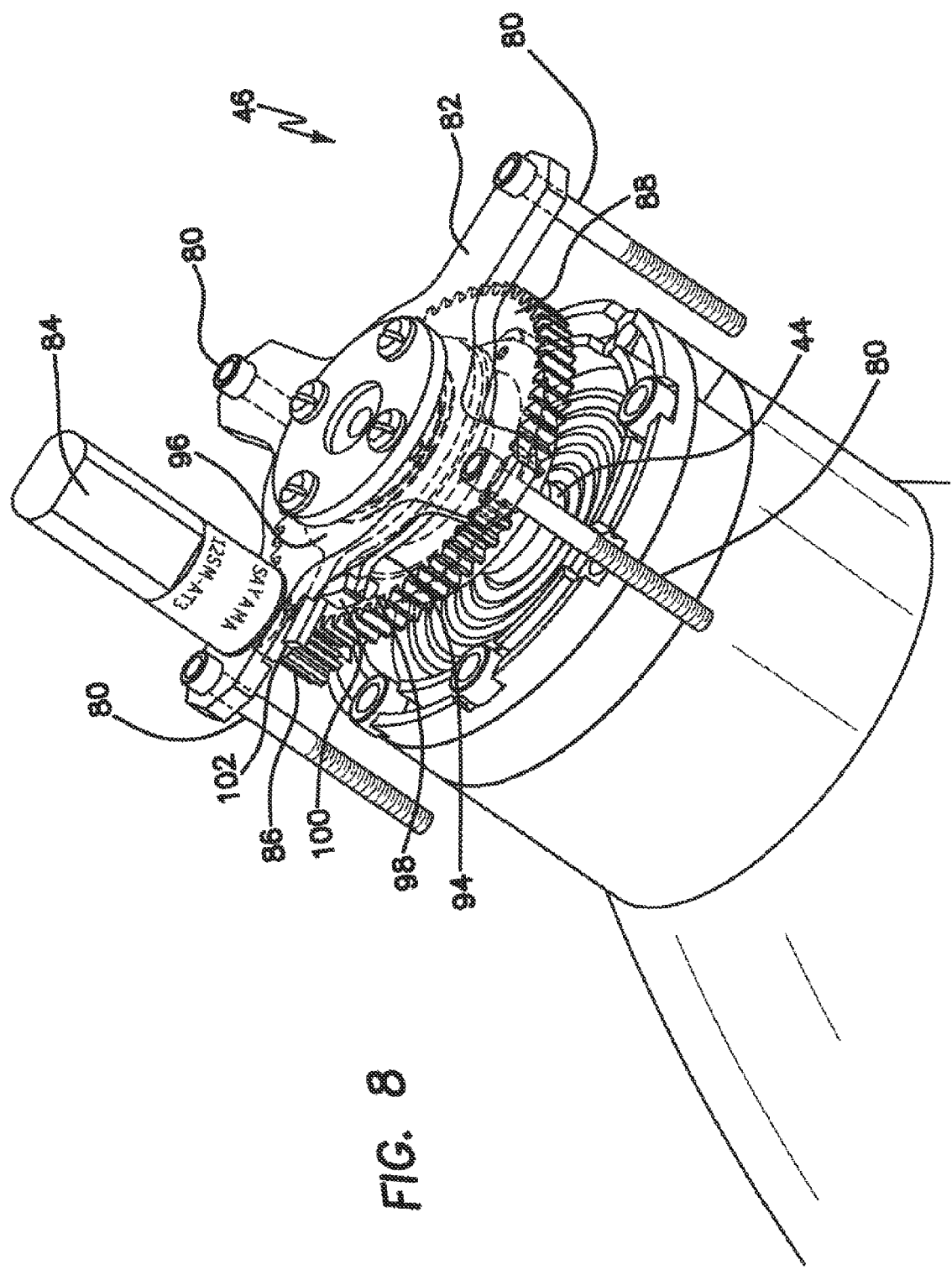
FIG. 8 is a rear perspective view of the thrust assembly mechanism.

A similar cylindrical cam (not shown), reversibly driven by an electric motor, can be substituted for the ring indexing assembly in FIG. 8 to provide a thrust assembly with bidirectionally limited lamp longitudinal displacement.

Gear Driven and Storable Internal IR Filter

Figure 30:
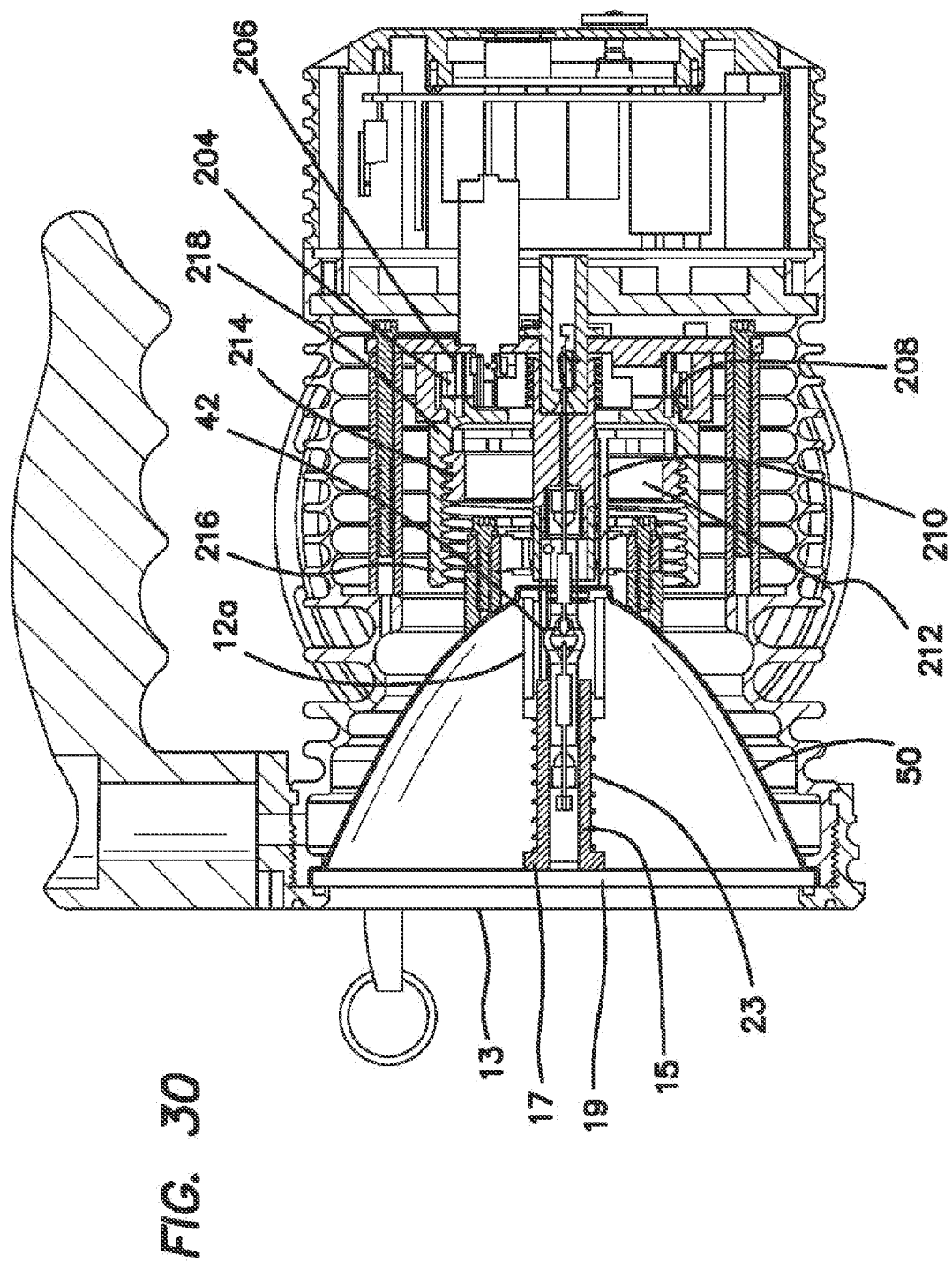
FIG. 30 is a longitudinal side cross-sectional view of yet another embodiment of the illuminator wherein the IR filter, shown in the rearward activated configuration, is provided as a telescopic sleeve over the lamp and activated by a screw-driven mechanism.
Figure 31:
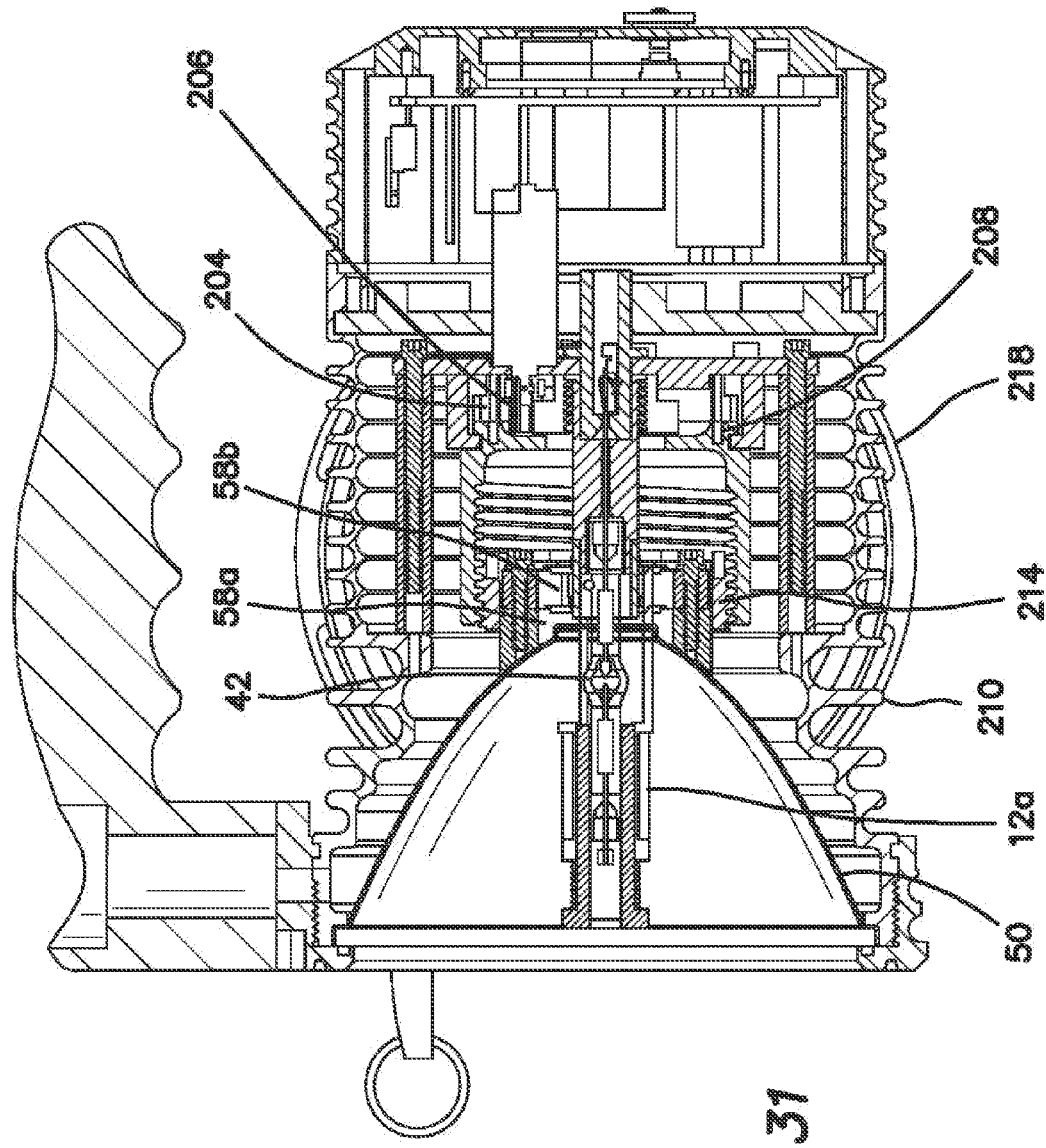
FIG. 31 is the longitudinal side cross-sectional view of FIG. 30 showing the IR filter, shown in the forward retracted or nonactivated configuration.
Figure 32:
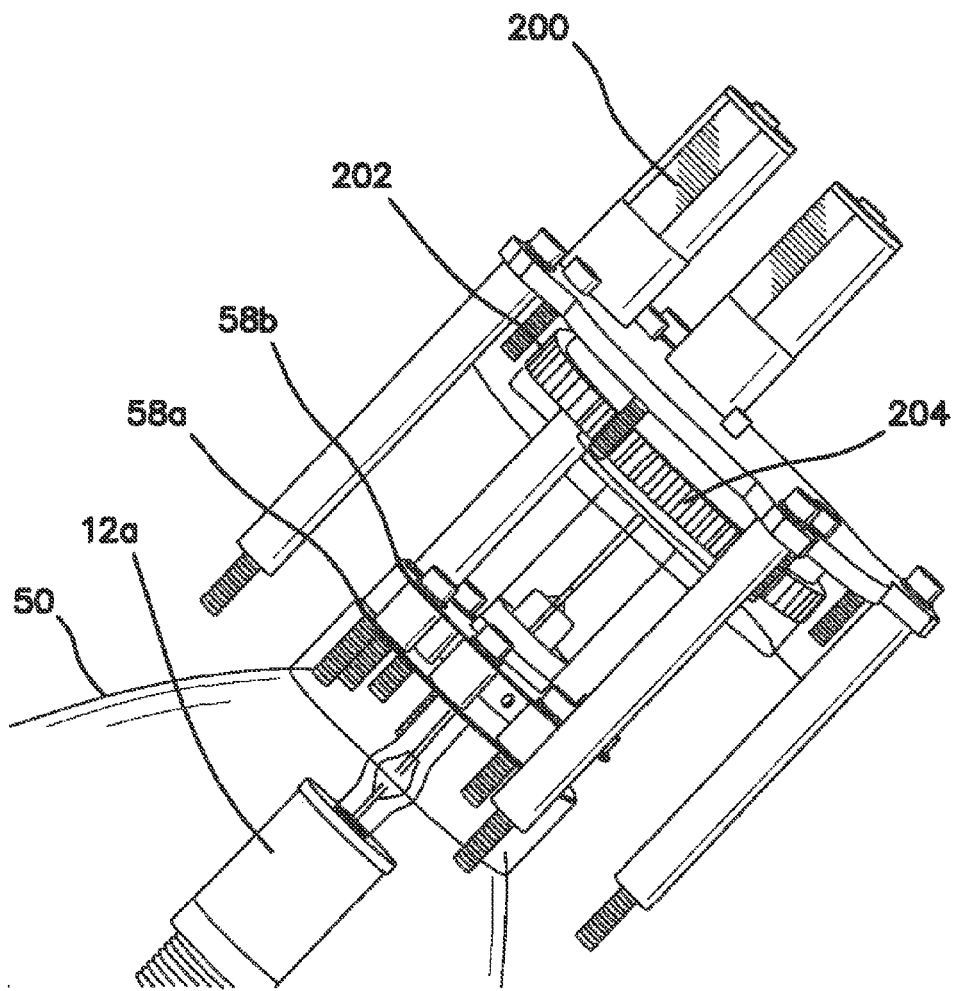
FIG. 32 is a partially disassembled perspective view showing the gear drive mechanism used in the embodiment of FIGS. 30 and 31.

FIGS. 30-32 depict another embodiment wherein the sleeve IR filter 12a is driven by means of a gear drive. FIG. 30 is a side cross sectional view wherein spring biased filter 12a on pedestal 15 is coupled at its right end as seen in FIG. 30 to a tripod of three slidable rods 210, one of which is shown in FIG. 30. One end of the rods 210 is coupled to mount 13 and the opposing end of rods 210 are coupled to a gear driven, movable hub 212. Hub 212 has a threaded front collar 214, which is engaged through the mutual threading to a rotatable driving gear 218. Hub 212 is cup shaped so that as it is driven forward it accommodates the lamp-to-reflector mounting and bellows diaphragms 58a and 58b without interference. As driving gear 218 rotates, hub 212 which is held in a nonrotatable configuration by means of the tripod of rods 210 telescoping through holes defined in the rear of reflector 50 is driven forward to the configuration shown in FIG. 31. Driving gear 218 is driven by a reversible motor 200, not visible in the views of FIGS. 30 and 31, but shown in the perspective simplified view of FIG. 32. Motor 200 has a drive gear 202 on its output shaft which is engaged with ring gear 204 coupled to driving gear 218. Ring gear 204 may be pinned to driving gear 218 by pin 206 as shown in FIGS. 30 and 31 or may be integrally fabricated with driving gear 218. Driving gear 218 is journaled within bearing 208 and rotates in place when reversibly driven by motor 200 thereby driving hub 212 forward or back thereby uncovering or covering lamp 42 with IR filter 12a respectively.

Figure 33:
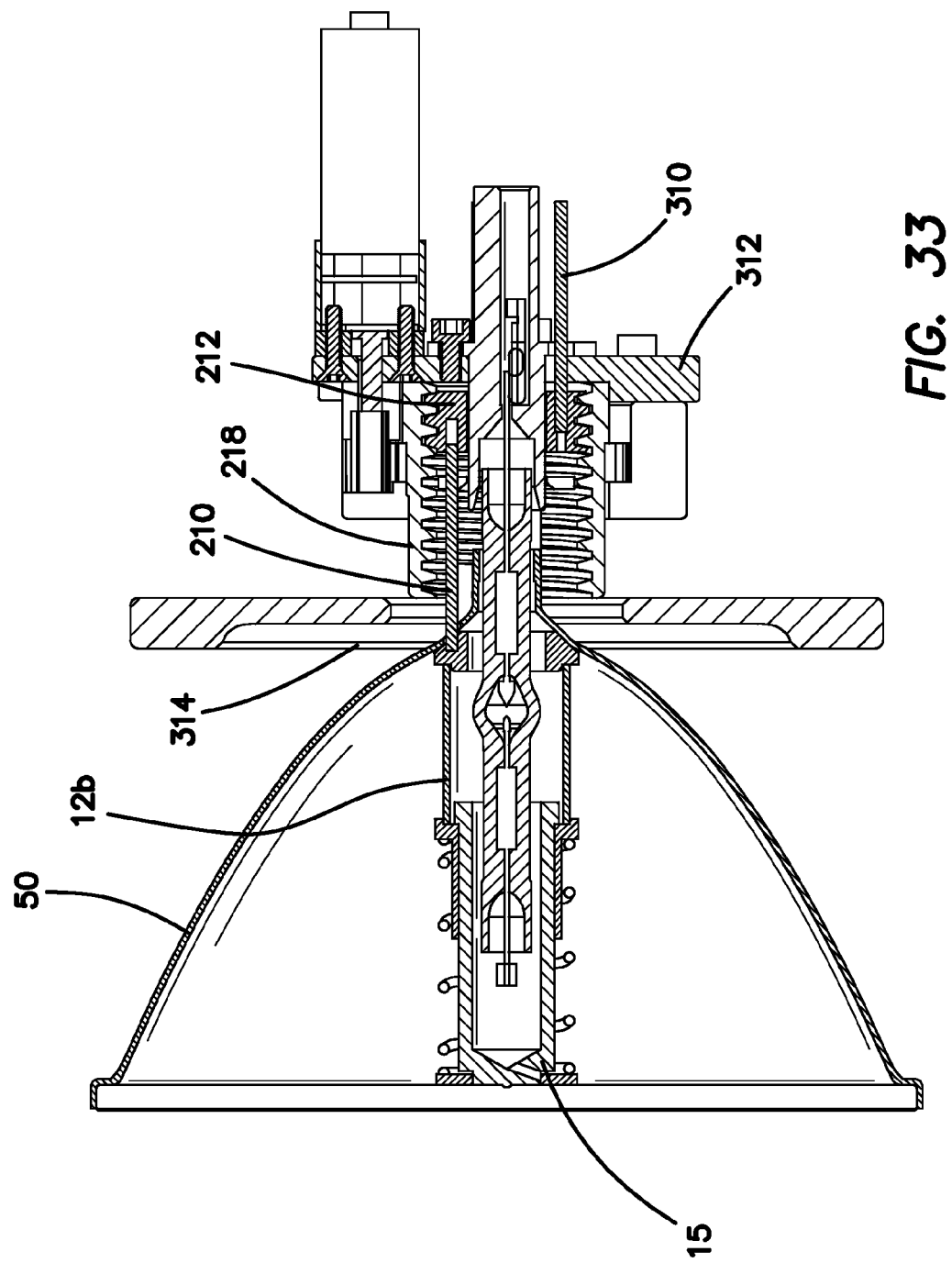
FIG. 33 is a longitudinal cross sectional view of selected internal components of another embodiment where an internal IR filter is controlled by a threaded drive and motor.

Another embodiment of the internal a sleeve IR filter 12b driven by means of a gear drive is shown in FIG. 33. FIG. 33 is a longitudinal, cross sectional view wherein spring biased filter 12b on pedestal 15 is coupled at its right end as seen in FIG. 33 to a tripod of three slidable rods 210, one of which is shown in FIG. 33 similar to the embodiment of FIG. 30. The embodiment of FIG. 33 are similar in all respects to the corresponding elements shown and described in connection with FIGS. 30 and 31 with the addition of three slidable rods 310, one of which is shown in FIG. 33. Rods 310 are coupled to hub 212 in a manner similar to the coupling of the tripod of rods 210, but rods 310 are coupled to rear or right portion of hub 212 as depicted in FIG. 33, extend and slide rearwardly through fixed housing plate 312. The tripod of rods 310 are positioned on the rear portion of hub 212 at an angularly offset from and between the angular position of tripod of rods 210 position on the front portion of hub 212. In other words, if the tripod of rods 210 are positioned on the front of hub 212 at 12, 8 and 4 o'clock positions, then the tripod of rods 310 are positioned on the rear of hub 212 at the 10, 6 and 2 o'clock positions. In the illustrated embodiment rods 210 and 310 have the same or similar diameters, lengths and are composed of similar materials with similar rigidities. The tripod of rods 210 extend through reflector 50 through corresponding holes defined in reflector 50. Holes 50 preferably have a diameter greater than the outer diameter of rods 210, so that rods 210 may be telescopically moved into and out of reflector 50 with touching reflector 50. This clearance or lack of contact between rods 210 and reflector 50 insures that the movement of rods 210 do not deflect or generate any vibration in reflector 50, which might be then visual in a vibration or movement in the light beam directed forward from reflector 50. However, at the same time hub 212 must be rotationally fixed as driving gear 218 rotates and drives hub 212 forwardly or rearwardly. In addition, smooth operation is facilitated if the angular orientation of hub 212 in three dimensions is stabilized as it is driven forwardly or rearwardly. The tripod support of rods 310 both stabilizes the three dimensional angular orientation of hub 212 as well as preventing it from rotating as it is longitudinally driven inside of driving gear 218. In the embodiments where reflector 50 is sufficiently rigid and/or thick such that contact with rods 210 cannot generate perceptible vibrations in reflector 50, holes 314 are sized so that rods 210 slidingly contact reflector 50 and the three dimensional angular orientation of hub 212 is stabilized and its rotation in gear 218 is prevented by the coaction of both the tripod of rods 210 at the front of hub 212 and the tripod of rods 310 at the rear of hub 212.

Detent Retention of IR Filter

Figure 22:
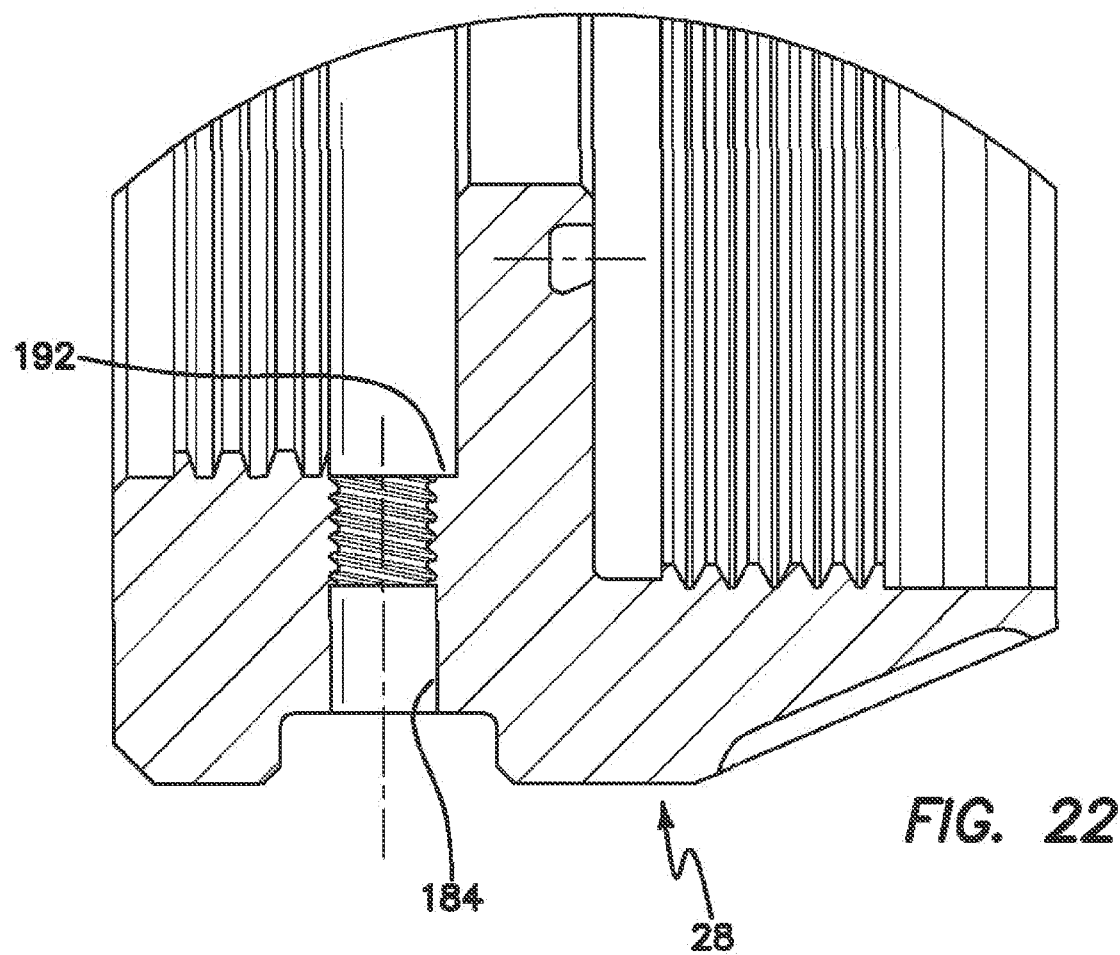
FIG. 22 is a side cross-sectional partial view of the lower edge of the front bezel.
Figure 23:
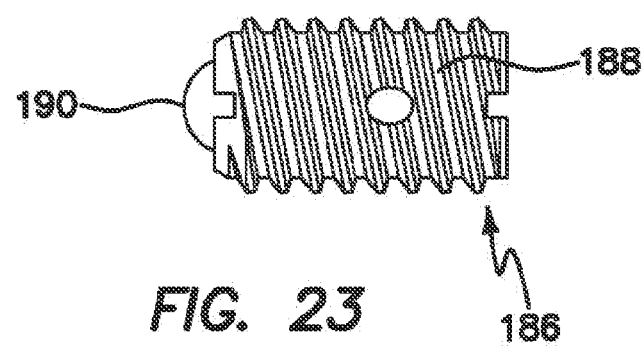
FIG. 23 is a side plan view of a spring plunger used in the detent configuration of FIG. 22.
Figure 24:
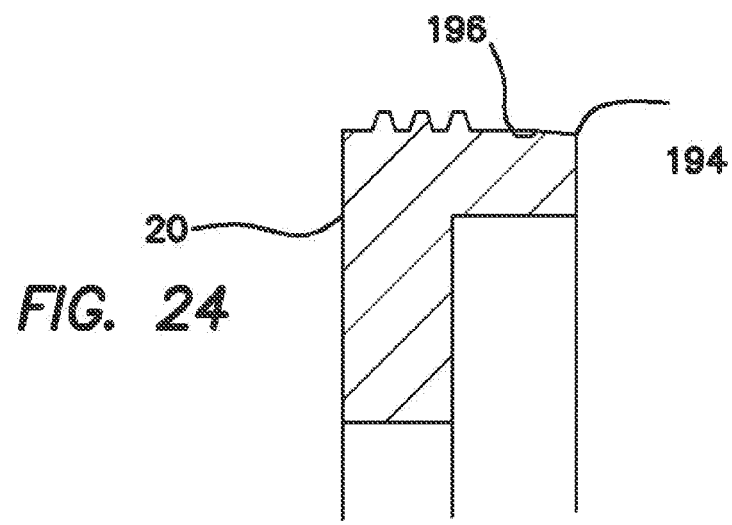
FIG. 24 is a side cross-sectional partial view of the upper edge of the frame of the IR filter that is screwed into the front bezel, when provided with a detent retention mechanism shown in FIGS. 22-24.

An enlarged side cross-sectional partial view of a lower edge of front bezel 28 is depicted in FIG. 22. A threaded bore 184 is defined in the rim of bezel 28 to receive a conventional spring plunger 186 shown in side plan view in FIG. 23. Spring plunger 186 has a threaded body 188 and a spring loaded detent ball 190 captured in it distal end. Plunger 186 is screwed into bore 184 so that detent ball 190 extends a predetermined distance into an unthreaded circumferential raceway 192 defined into bezel 28. When frame 20 of IR filter 12 is manually screwed into bezel 28, its rear edge will extend into raceway 192 and bear against detent ball 190. FIG. 24 depicts an enlarged side cross-sectional partial view of the rear edge of frame 20, which is provided with an unthreaded flange 194, which will mate with raceway 192. One or a plurality of longitudinal grooves or socket holes 196 sized to fit ball 190 are defined in flange 194. As frame 20 is manually rotated, detent ball 190 will be forced into grooves or socket holes 196 as they are aligned with ball 190. Application of an increased force must then be applied to rotate frame 20 out of the detent configuration. In this manner frame 20 is retained by the detent force within bezel 28, thereby preventing its loosening by vibrations or accidental forces applied to it, which might otherwise tend to rotate it out of bezel 28.

It must be understood that other configurations are possible for plunger 186 and the same function can be realized. For example, if desired, plunger 186 can be radially disposed into tabs 22 in the forward edge of frame 20 and the grooves or socket holes 196 defined in the forward edge of bezel 28 or the reverse, namely the plunger 186 disposed in the forward edge of bezel 28 and the grooves or socket holes 196 disposed in the forward edge of frame 20, and aligned with tabs 22 or not.

High G-Force Diaphragm Shock Mount for the Lamp

The lamp mounting assembly shown in FIG. 3 is better seen in the enlarged view of FIG. 4. Lamp 42 has its anode contact 48 mounted in a cylindrical receptacle 44, which in turn is coupled or fixed to a movable thrust assembly 46. Receptacle 44 positions the longitudinal axis of lamp 42 on the optical axis 52 of reflector 50 and also serves to position the plasma ball formed between the anode 54 and cathode 56 within lamp 42 at a predetermined position in relation to the focal point of reflector 50. As is well known in the art, lamp 42 is bidirectionally translated on the optical axis 52 by thrust assembly 46 to zoom focus the beam produced by illuminator 10. Precise positioning of lamp 42 must be maintained in order to preserve the optical performance of illuminator 10 despite the fact that illuminator 10 is securely mechanically coupled to a machine gun which places high G-force shocks on illuminator 10 and the entire mechanism within it, including the entire lamp mounting assembly shown in FIG. 4.

In order to maintain the rigidity of the lamp mounting assembly in this environment while still allowing lamp 42 to be precisely translated along the optical axis 52, receptacle 44 is held in position by a pair of bellows diaphragms 58*a* and 58*b*. The outer circumferential edges of bellows diaphragms 58*a* and 58*b* are fixed directly or indirectly to body 60 of illuminator 10. The inner circumferential edges of bellows diaphragms 58*a* and 58*b* are fixed directly or indirectly to receptacle 44. Bellows diaphragms 58*a* and 58*b* are spaced apart by a predetermined distance along the longitudinal axis of lamp 42 to provide a stable fore and aft support and fixation of receptacle 44 and, hence, lamp 42. A radial portion of each of bellows diaphragms 58*a* and 58*b* is corrugated by a plurality of concentric rings so that bellows diaphragms 58*a* and 58*b* act as bellows springs to allow thrust assembly 46 to move receptacle 44 bidirectionally along the longitudinal axis of lamp 42. However, bellows diaphragms 58*a* and 58*b* are extremely stiff or rigid in every radial direction relative to receptacle 44 and the optical axis 52. This feature is particularly useful when it is understood that as the gun elevation is raised relative to the search light beam for distant targets, much of the shock force on illuminator 10 will have a large radial component.

It is also within the scope of the invention that bellows diaphragms 58*a* and 58*b* could be replaced by dual springs contained within a longitudinally fixed telescopic or sliding mechanism to provide radial rigidity without interference with longitudinal elasticity.

Movement in the longitudinal direction along optical axis 52 is controlled and limited by virtue of the coupling of receptacle 44 to thrust assembly 46, which itself is rigidly fixed relative to body 60. High-G gun vibrations or shocks, which are transmitted to receptacle 44 and lamp 42, therefore cannot produce any relative movement of receptacle 44 or lamp 42 with respect to reflector 50, which in turn is also directly or indirectly rigidly coupled to body 60, and hence cannot produce any relative movement of receptacle 44 or lamp 42 with respect to optical axis 52. The optical performance of illuminator 10 is unaffected by high-G shocks without any limitation in the ability to move lamp 42 along the optical axis 52 for zoom operation.

During initial assembly bellows diaphragms 58*a* and 58*b* are preloaded or biased to maintain the threading within thrust assembly 46 under a continuous force or bias. Because of the continuous bias, the backlash normally experienced in all threaded mechanisms is eliminated in both directions of zoom adjustment. Because of the relatively high longitudinal bias provided by bellows diaphragms 58*a* and 58*b* as compared to thread biasing arrangement in other zoom mechanisms known in the art which use the compression of elastic O-rings, the zoom focus of lamp 42 operates in a steady and controlled manner notwithstanding high vibration and g-loads to which illuminator 10 is subjected when rigidly coupled to a firing gun.

Rotational Limitation of Lamp Longitudinal Displacement

FIG. 8 is a rear perspective in partial phantom view of the thrust assembly 46 shown in FIG. 4. The forward portion of thrust assembly 46 is pressed against receptacle 44 by tightening of four bolts 80, which are through-bolted through four corresponding arms of yoke 82. Electric motor 84 turns a drive gear 86, which is engaged with a driven ring gear 88, which is keyed to and turns a thrust collar 90. Thrust collar 90 is threaded to a fixed threaded bushing 92. Thrust collar 90 bears against the back flange of receptacle 44, so that as thrust collar 90 is rotated in either sense to advance or withdraw it along threaded bushing 92, it will advance against or withdraw away from receptacle 44 which is biased by bellows diaphragms 58*a* and 58*b*. The rotation of thrust collar 90 is limited in the illustrated embodiment to three turns so that it cannot be advanced on threaded bushing 92 beyond a predetermined limit and hence will not exceed the elastic limit of bellows diaphragms 58*a* and 58*b*. Threaded bushing 92 is rigidly fixed relative to yoke 82. At the same time, allowing multiple turns on threaded bushing 92 also allows for a finer gradation zoom control on lamp 42. In other words, while the pitch on threaded bushing 92 could have been made three times coarser and a single turn only on threaded bushing 92 allowed, the degree of precise control on lamp 42 would have been substantially sacrificed.

Rotation of driven gear 88 is limited to three turns by two corresponding rotatable index rings 94 and 96, which are free to rotate around threaded bushing 92. An index post 98 extends from rear surface of driven gear 88. Post 98 begins from an initial position as shown in FIG. 8 where it is immediately adjacent to index arm 100 of index ring 94. As gear 88 rotates in the counterclockwise direction as seen in FIG. 8, it travels after a first full revolution to the opposing side of index arm 100. Upon contacting the side of index arm 100 hidden in the view of FIG. 8 as gear 88 continues to rotate in the counterclockwise direction as seen in FIG. 8, index post 98 picks up index arm 100 and rotates index ring 94 in the counterclockwise direction as seen in FIG. 8. After a second full counterclockwise revolution index arm 100 will have been rotated and immediately adjacent to the hidden side of index arm 102 of index ring 96. The initial position of index arm 100 is immediately adjacent to the side of the end position of index arm 100 of index ring 94 which is shown in FIG. 8. Index arm 102 will be carried by index arm 100 as gear 88 rotates in the counterclockwise direction as seen in FIG. 8, until a third full counterclockwise revolution is made at which point index arm 102 comes to bear against the side of the top or rear portion of drive gear 86 at which point further rotation of index ring 96 is prevented. The stopping of index ring 96 in turn stops rotation of index ring 94 and 96 which rigidly extends from driven gear 88. Motor 84 ceases to rotate and will become loaded, which will be sensed as a change in motor current by the control electronics. The loading of motor 84 is electronically sensed and the current to motor 84 is shut off. Thereafter, motor 84 may only be powered up again if it is rotated in the opposite clockwise direction as seen in FIG. 8 as determined by the control electronics logic. By the same mechanism described above, driven gear 88 may then be rotated three full clockwise revolutions back to the initial configuration seen in FIG. 8 at which point motor 84 will again be stopped and the current shut off.

It is to be expressly understood that the number of index rings and arms can be easily added or deleted from thrust assembly 46 without requiring redesign or remanufacture of illuminator 10 so that the number of turns which can be provided can be varied. Further, it is also possible to eliminate the index rings and arms and instead change the length of collar 90 which is threaded and change the pitch of threading to allow only a predetermined number of revolutions before a stop on collar 90 is reached. In such a case the threading would be finished at each end of collar 90 so that a threading jam or lock would not be realized.

Figure 25:
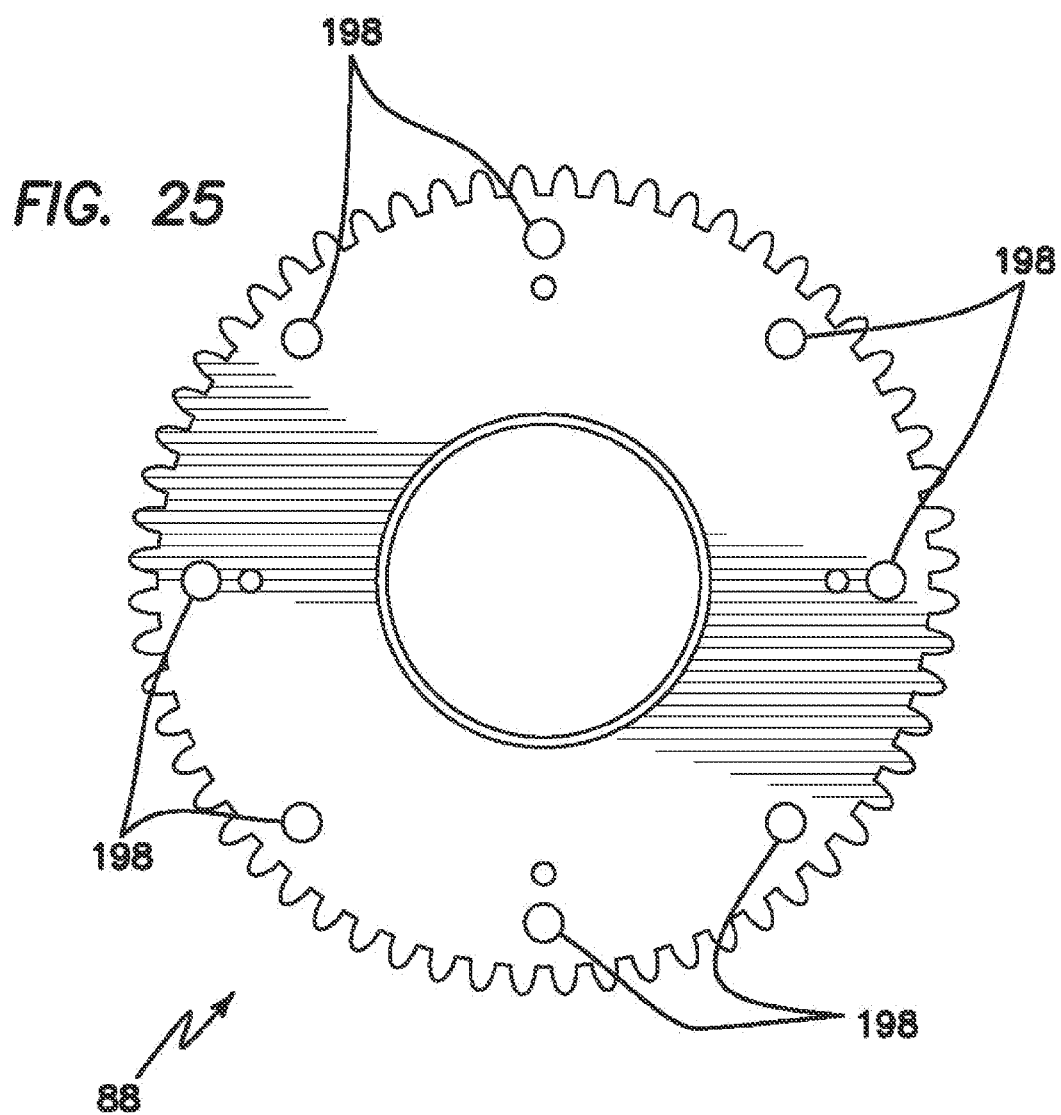
FIG. 25 is a plan view of the driven gear in the thrust assembly of FIG. 8 showing a plurality of holes for receiving the index pin in a zero configuration for precise adjustment of the gap between the lamp receptacle and the thrust assembly.

However, utilizing a measured threaded drive section on collar 90 as suggested above requires demanding manufacturing and assembly tolerances, since thrust assembly 46 is positioned relative to receptacle 44 so that there is a zero position in which a small gap is provided between thrust assembly 96 and receptacle 44 having tolerances on the order of 0.0010's of an inch at the zero position of bellows diaphragms 58a and 58b. This zero position is required to provide a configuration where the lamp assembly and related elements can be accessed in a nonbiased configuration to avoid damaging those elements. However, the tolerance must be held to a predetermined minimum to avoid backlash and to insure responsive and precise zoom operation. The index ring and arm embodiment provides the solution to these design constraints by providing a plurality of holes 198 in gear 88 as shown in the plan view of FIG. 25 into which holes 198 post 98 can be selectively disposed. The position of post 98 defines the zero or initial position of gear 88. Gear 88, whose rotation drives thrust assembly 96, is rotated until thrust assembly 96 is positioned relative to receptacle 44 so that a zero position is realized where a gap is provided between thrust assembly 96 and receptacle 44 with a tolerance on the order of 0.0010's of an inch. Post 98 is then disposed into the appropriate one of the plurality of holes 198 shown in FIG. 25 in gear 88 nearest to arm 100 in the configuration illustrated in FIG. 8.

Field Serviceable Lamp Assembly

Figure 6:
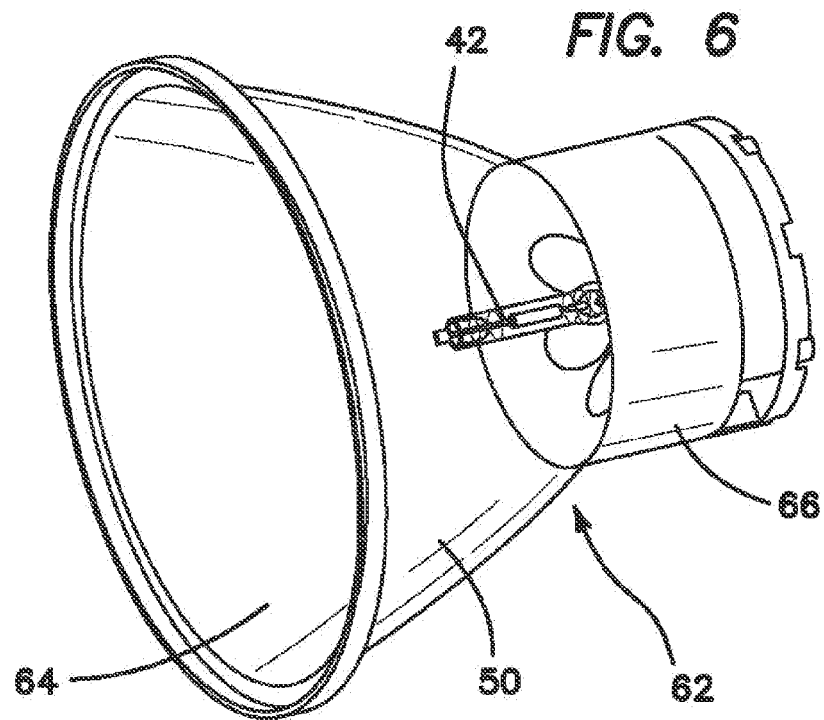
FIG. 6 is a perspective view of the field replaceable, drop-in sealed lamp module of the illustrated embodiment.

FIGS. 5 and 6 illustrate another feature of the illustrated improvements, wherein in the entire lamp assembly module 62 is an integrated or modular and sealed unit like a conventional light bulb. The material lamp elements described in connection with FIG. 4 are included in module 62, namely lamp 42, reflector 50, receptacle 44 and bellows diaphragms 58a and 58b. It is to be expressly understood that other elements may also be included within module 62, which have not been explicitly discussed above, such an electronic IR filter changer or other optical add-ons. Heretofore, if for any reason a lamp 42 had to be replaced, the face of the illuminator 10 would be opened with special tools and lamp 42 removed and replaced. However, arc discharged lamps may not be touched by bare hands without seriously compromising their performance or longevity, and the removal of lamp 42 not only required special tools, but had to be done carefully in order not to misalign any of the internal optical components, if the specified optical performance was to be obtained. This required the illuminator 10 to be removed from the field to a warehouse location where the special tools needed were kept and a trained technician could competently undertake the lamp replacement procedure.

In contrast in the illustrated embodiment a user in the field using the illuminator 10 is able to unscrew retainer ring 64 shown in FIG. 3 from the front of illuminator 10 either manually without any tools or, at most, with simple nonspecialized tools, remove lamp assembly module 62 as a single piece, drop in a replacement and then screw retainer ring 64 back into place. A transparent faceplate 19 covers reflector 50 sealing lamp 42 from access and debris and the entire module 62 slides out of and into its seated position in body 60 against thrust assembly 46. Reflector 50 and module base 66 easily slip fit into a conforming receiving space defined in body 60 and thrust assembly 46. Relative rotation of module 62 within this conforming space has no effect on operation or optical performance of illuminator 10. Module 62 is tightly pressed into the conforming space against body 60 and thrust assembly 46 by tightening of ring 64 thereby providing the rigid relative positioning or coupling of module 62 and its internal components to body 60 and thrust assembly 46.

Fast Start, Infrared Enhanced HID Lamp

In one of the illustrated embodiments, lamp 42 is modified as compared to conventional HID lamps by the addition of finely granulated metal halide salts into the lamp envelope. Conventional HID lamps are designed to minimize the generation of IR light. However, the illustrated embodiment includes the addition of metal halide salts which enhance selected IR lines or IR spectral segments. The presence of such metal halide salts allows their incorporation into the plasma ball, which in turn results in a substantially higher production of infrared light as compared to conventional HID lamps not having such metal halide salts added.

Figure 26:
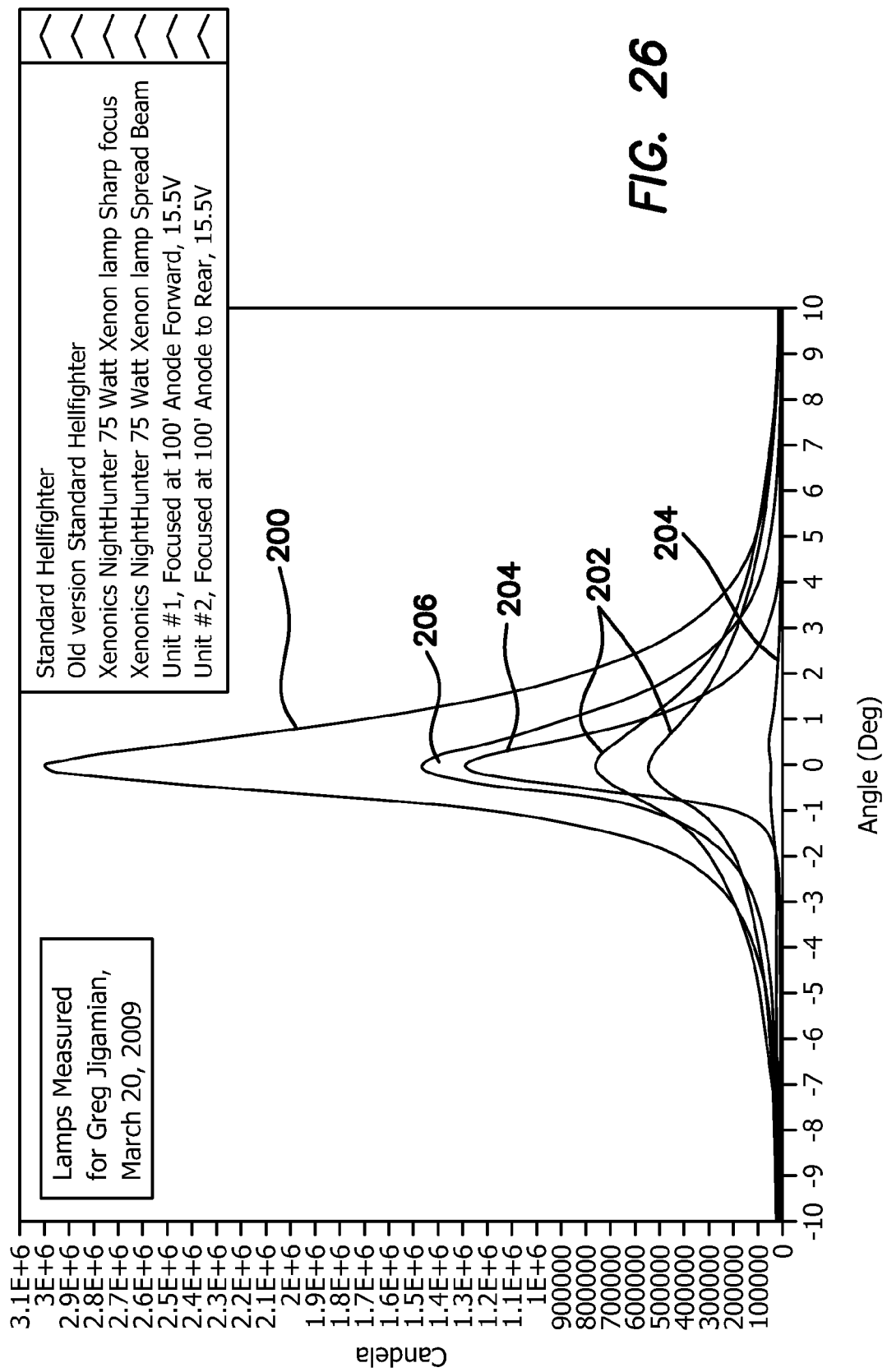
FIG. 26 is a graph showing the candela output of the illuminator of the illustrated embodiments as a function of angle relative to the main beam as compared to several prior art illuminators.

FIG. 26 is a graph of the total energy output of a number of different illumination devices as a function of the polar angle off the main beam axis. Curve 200 corresponds to illuminator 10 of the illustrated embodiments with the anode of lamp 42 positioned within illuminator 10 toward the front of illuminator 10 and curve 206 corresponds to illuminator 10 of the illustrated embodiments with the anode of lamp 42 to the rear. Curves 202 are prior versions of the improved illuminator such as shown in FIG. 1, curves 204 correspond to two different versions of illumination search lights currently made by Xenonics Inc. of Carlsbad, Calif. It should be noted that the measurement of intensity is in units of candela, which is the relevant measure of the intensity of light proportional to the range of the light, giving the illuminator 10 of the illustrated embodiments significantly greater range than could be realized by the Xenonics illuminators. Further, the angular spread of curve 200 has a greater intensity over a greater angular range than even the widest spread beam of the Xenonics illuminator 10 shown in the lower one of curves 204.

Figure 27:
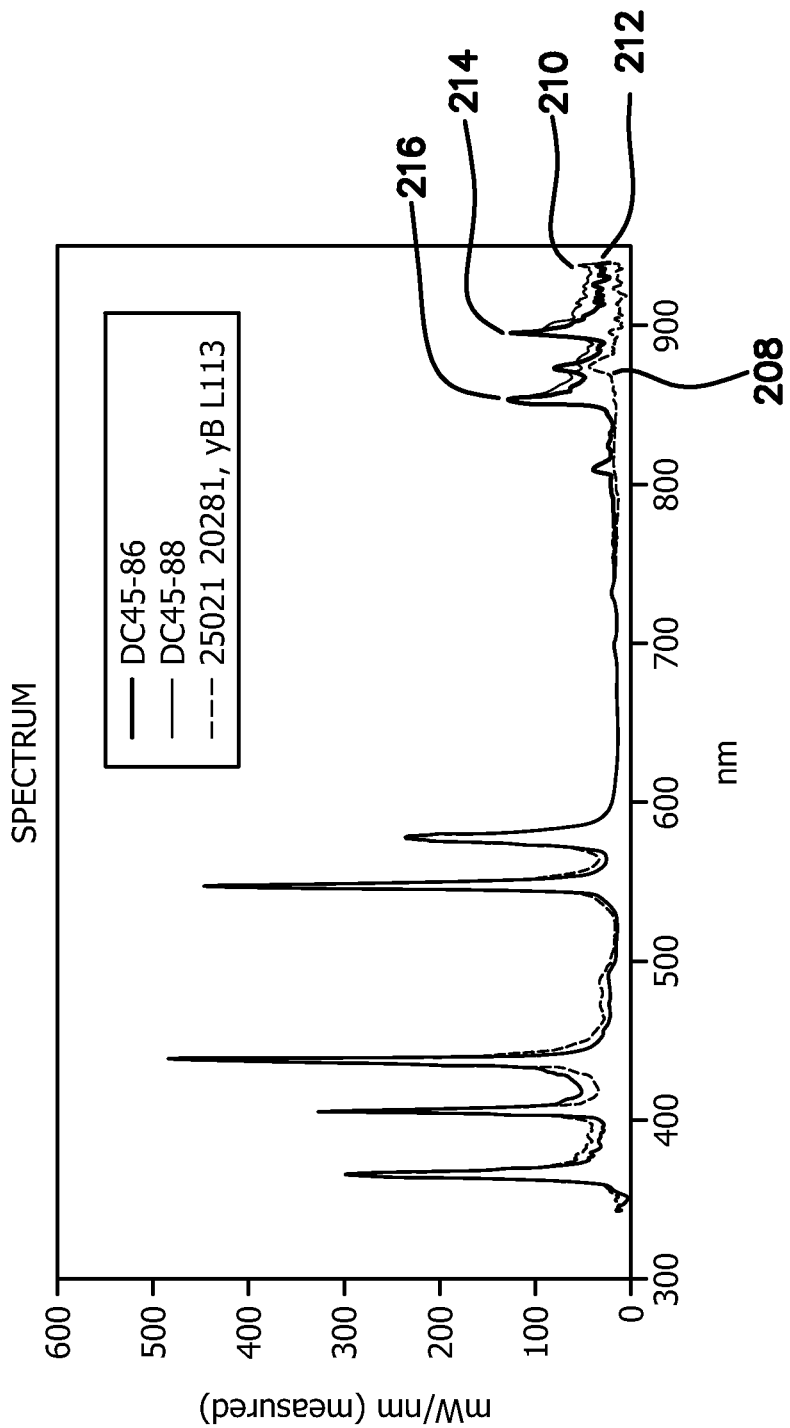
FIG. 27 is a graph showing the power density of the IR spectrum of the lamp of the illuminator of the illustrated embodiments as compared to an identical lamp not improved as taught by the illustrated embodiments.
Figure 27A:
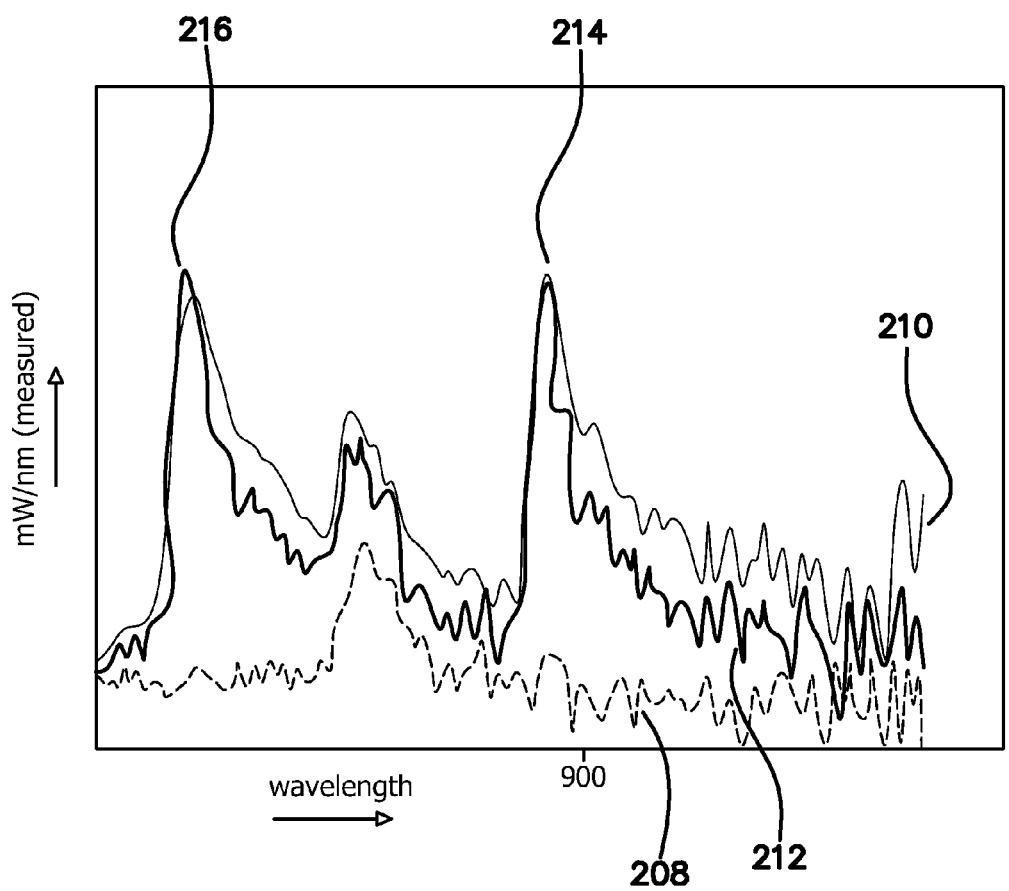
FIG. 27a is an enlarged portion of the spectral graph of FIG. 27 better showing the enhanced IR performance of the illustrated embodiments.

FIG. 27 is a spectral graph of the output of two embodiments of the lamp 42 of the illustrated embodiment shown by the curves 210 and 212 as compared to a lamp of otherwise identical design without the addition of any metal halide salts granules shown by the curve 208. The spectral output of the lamps are comparable from 350 nm to about 840 nm after which the spectral output energy density mW/nm jumps dramatically for lamps 42 devised according to the teachings of the illustrated embodiments to achieve a relative peak difference at about 850 nm and at about 880 nm. As better shown in the enlarged view of the graph of FIG. 27a, the output energy density mW/nm of lamps 42 devised according to the teachings of the illustrated embodiments remains above that of an unmodified identical lamp for all measured values beginning at about 840 nm and above.

Figure 28:
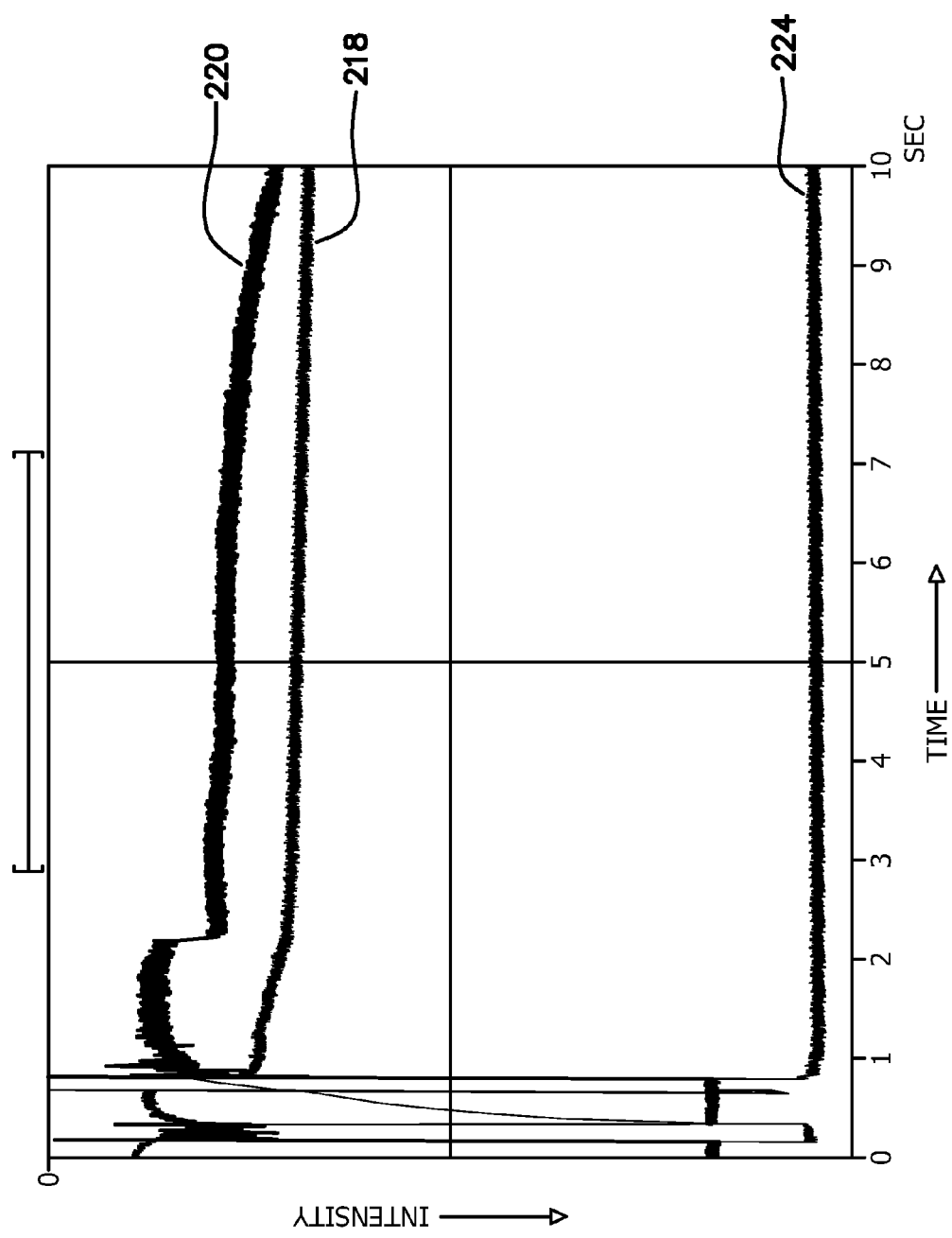
FIG. 28 is graph of the total energy output of the illuminator of the illustrated embodiments as a function of time illustrating the fast start to at least 80% of full intensity within one second or less.

The electronic ballast in illuminator 10 is designed to provide rapid starting of lamp 42, namely more than 80% of the final lumen output within one second or less, and provides arc stability. The fast start performance of illuminator 10 is graphically depicted in FIG. 28 where total energy output of all IR and visible light is depicted as a function of time by curve 218, wherein intensity increases in the downward direction in the graph. Curves 220 and 224 show the voltage and current respectively on the lamp 42 as a function of time. It is readily apparent that approximately 80% the final or full intensity of lamp 42 is reached within 1 second from the start of operation.

Field Serviceable Electronics Module

Figure 7:
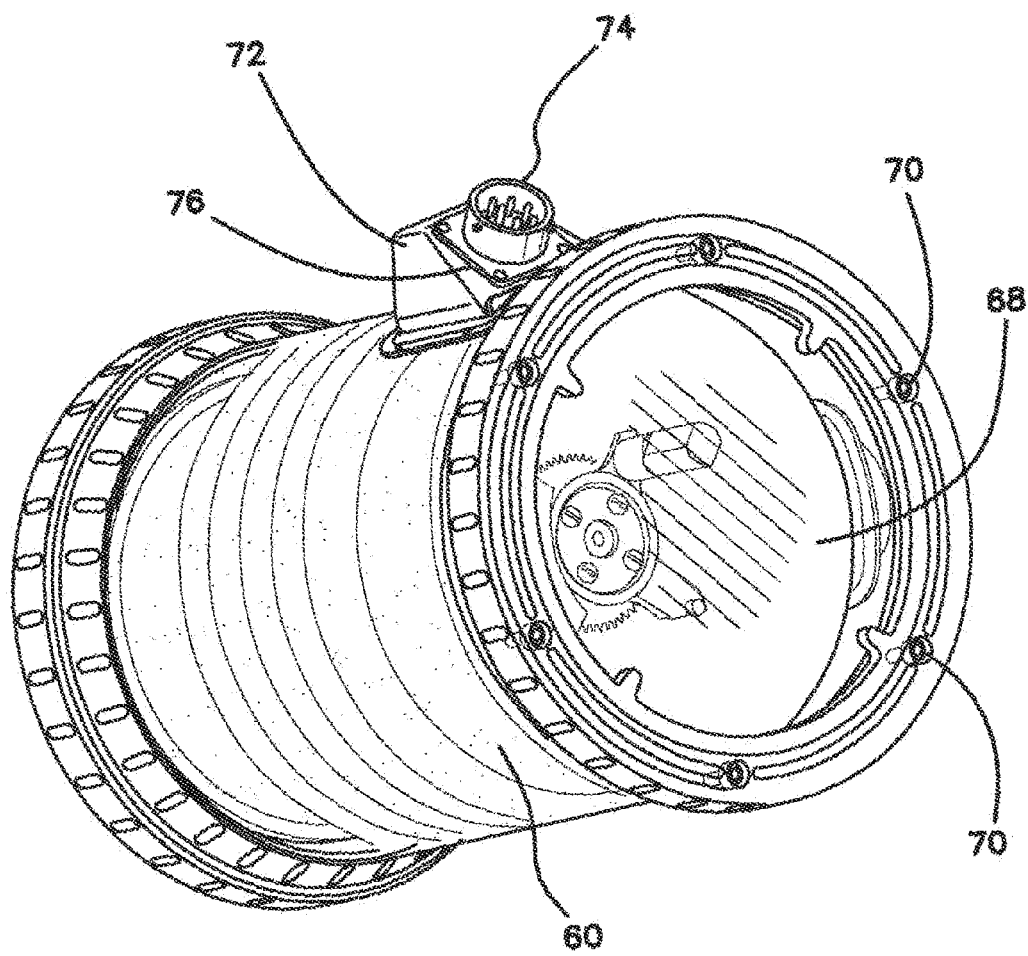
FIG. 7 is a rear perspective view of the illuminator.

FIG. 7 illustrates yet another embodiment of the illustrated invention wherein an electronic module 68 for lamp, filter and zoom operation, also shown in FIG. 3, is manufactured in a modular package that is field serviceable. In particular module 68 is accessed by removing rear bezel 32 by unscrewing a plurality of hex head screws 70 using a conventional Allen wrench which is part of the standard field military toolkit. Alternatively, rear bezel 32 may be screwed into body 60 in a manner similar to front bezel 28, so that its installation and removal may be made without the use of tools. Module 68 is moisture sealed by potting. Once rear bezel 32 is removed module 68 can either be easily slid out, having been retained in body 60 by bezel 32, or further removed by unscrewing mounting screws (not shown) attaching it directly or indirectly to thrust assembly 46 and/or body 60. In the illustrated embodiment, module 68 is toroidal or at least C shaped so that it surrounds thrust assembly 46, uniquely fits into thrust assembly 46 by means of guides or keys (not shown) and has electrical contacts which are automatically contacted with matching electrical contacts of thrust assembly 46 (not shown) when module 68 is properly aligned and fit into position. All of the electronics needed to operate illuminator 10 is included in module 68 so that if there is any electronic malfunction of illuminator 10 in the field, all of the electronic circuitry needed for its operation is readily removed in the field by the user by unscrewing rear bezel 32, dropping out the defective module 68, inserting a replacement module 68, and reattaching rear bezel 32 without any further attention or consideration of the details of electronic functions or mountings.

Angled Cable Connector

FIG. 7 illustrates another embodiment of the invention in which an angled connector housing 72 is connected to the outside of body 60 and includes an angled mounting face 76 to which lamp connector 74 is mounted. Face 76 is angled relative to the longitudinal axis of body 60 or optical axis 52 to allow for a gentler bend of the cable coupled to connector 74. Generally, a gun shield (not shown) is mounted closely behind illuminator 10 so that the power and control cable (not shown) connected to illuminator 10 through connector 74 comes from the rear of illuminator 10 or from the rear of the gun. If the power and control cable is coupled into the rear of illuminator 10, the power and control cable must be bent by 90° in order to be routed around the closely positioned or adjacent gun shield and run back to the rear of the gun where it is coupled to the operator's remote light controller. If the power and control cable is coupled to illuminator 10 into the side of body 60, its distal or illuminator end is at 90° to the longitudinal axis of body 60 or optical axis 52 and the power and control cable must then be bent by 90° in order to lead it around the gun shield to the rear of the gun. In the illustrated embodiment face 76 is angled at 45° to the longitudinal axis of body 60 or optical axis 52, thereby substantially lessening the bend through which the power and control cable must be bent in order to lead it around the gun shield to the rear of the gun. It is to be understood that the relative inclination of face 76 to the longitudinal axis of body 60 or optical axis 52 may have other values chosen to lessen or optimize the size of the bend required to be applied to the power and control cable given the relative configuration of the gun shield and illuminator 10.

Illuminator Handle

Illuminator 10 was provided with a handle 78 as shown in the prior art view of FIG. 1 which allowed for illuminator 10 to be coupled to the gun and also allowed it to be manually carried. The embodiment of FIG. 1 illustrates the prior use of a Picatinny rail for coupling the illuminator 10 to the gun. The gun was also previously provided with a T-bar coupling proprietary to SureFire, LLC. The proprietary T-bar coupling was successfully employed and provided several advantages over the conventional Picatinny rail, but also was of such a configuration that the use of two hands was required to couple and uncouple illuminator 10 from the T-bar rail.

Figure 9:
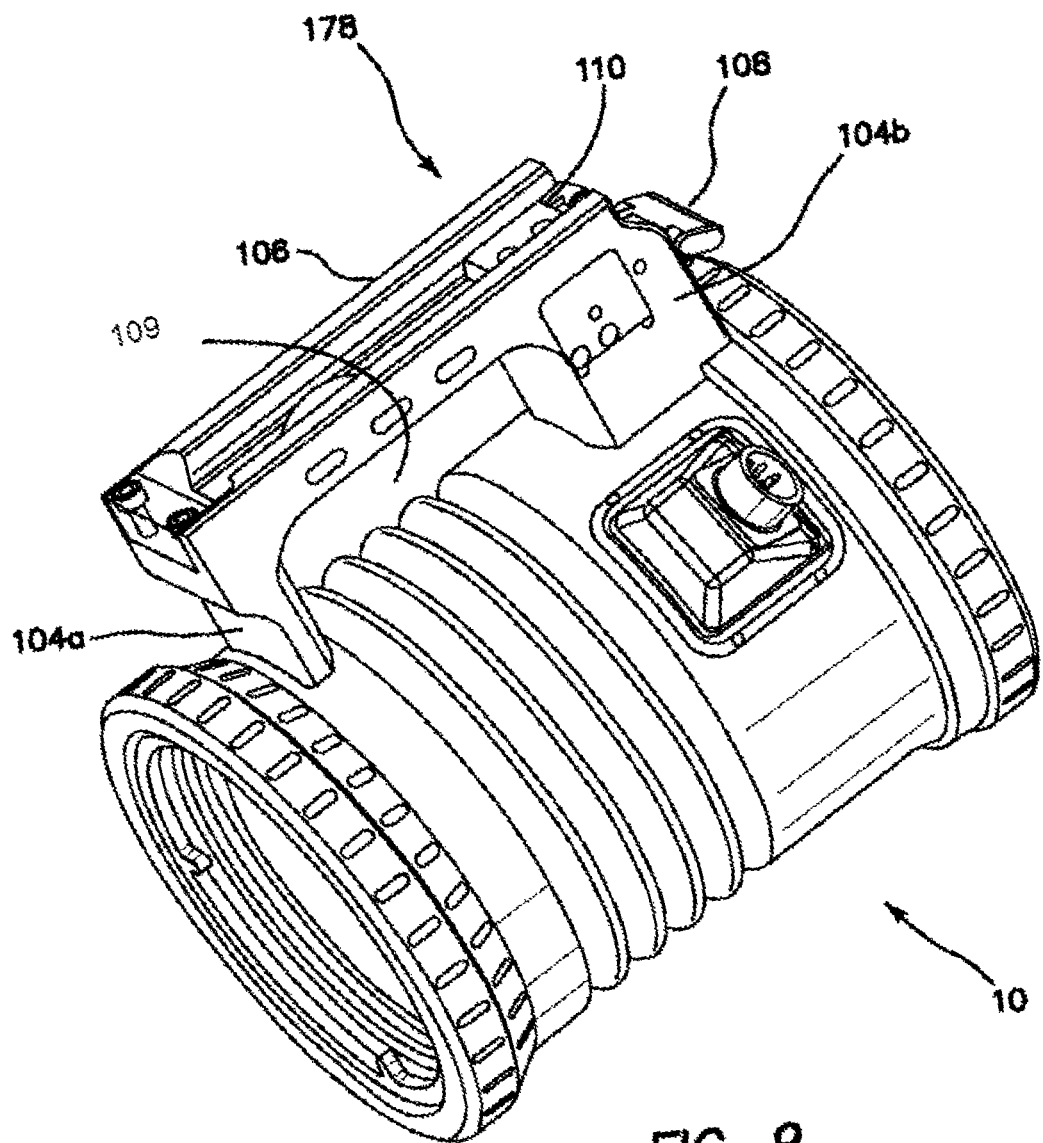
FIG. 9 is a side perspective view of the illuminator showing an attached T-slot handle.

FIG. 9 is a perspective view of illuminator 10 provided with a handle 178 of the illustrated embodiments of the invention. Handle 178 is rigidly fixed to body 60 of illuminator 10 by two arms 104a and 104b between which rigidly extends a T-bar slide 106. The open space 109 defined by arms 104a and 104b and the underside of slide 106 provides a convenient hand grip for carrying illuminator 10. A double locked latch lever 108 at an open end of handle 178 can be manipulated with one hand to lock handle 178 onto the T-bar rail with the same hand used to mount handle 178 and illuminator 10 onto the T-bar rail.

Figure 10:
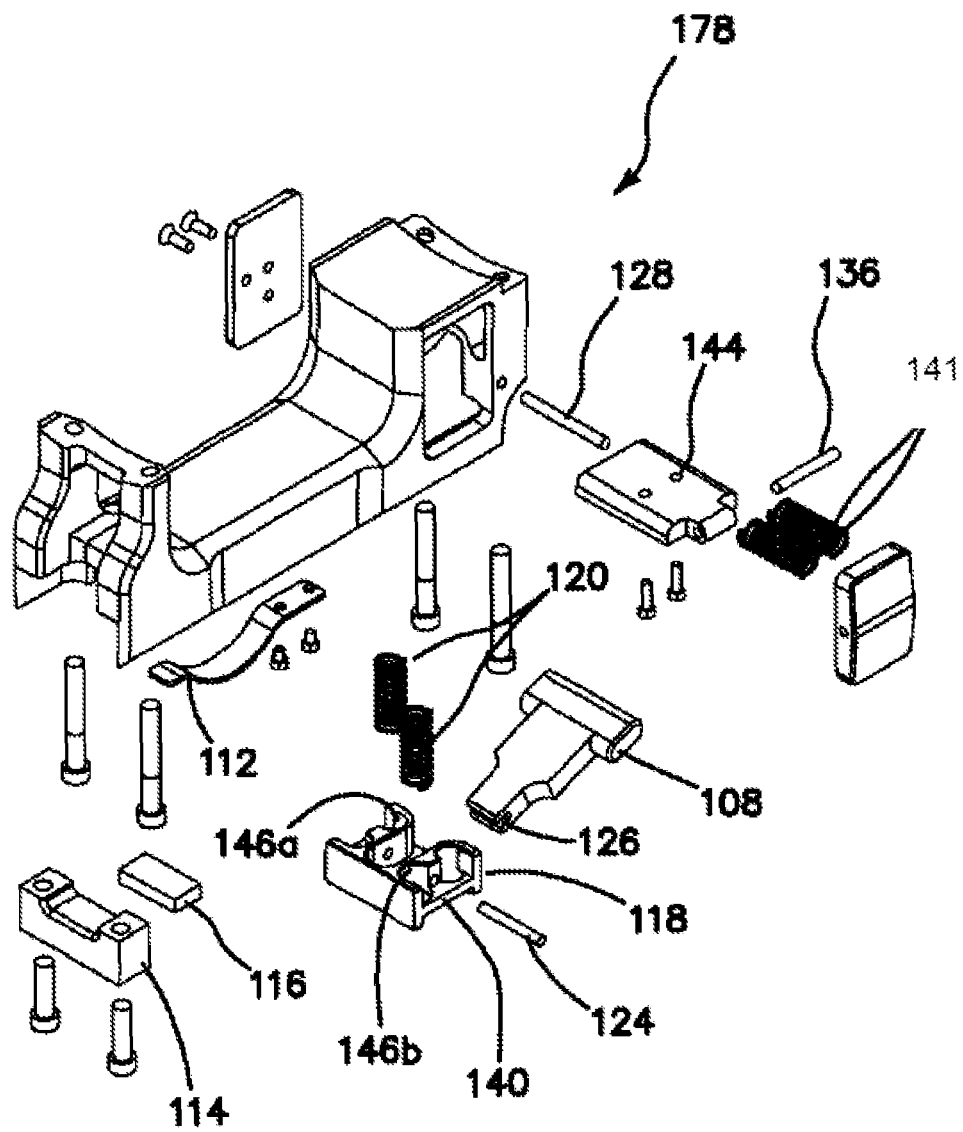
FIG. 10 is an exploded perspective view of the handle shown in FIG. 9.
Figure 11:
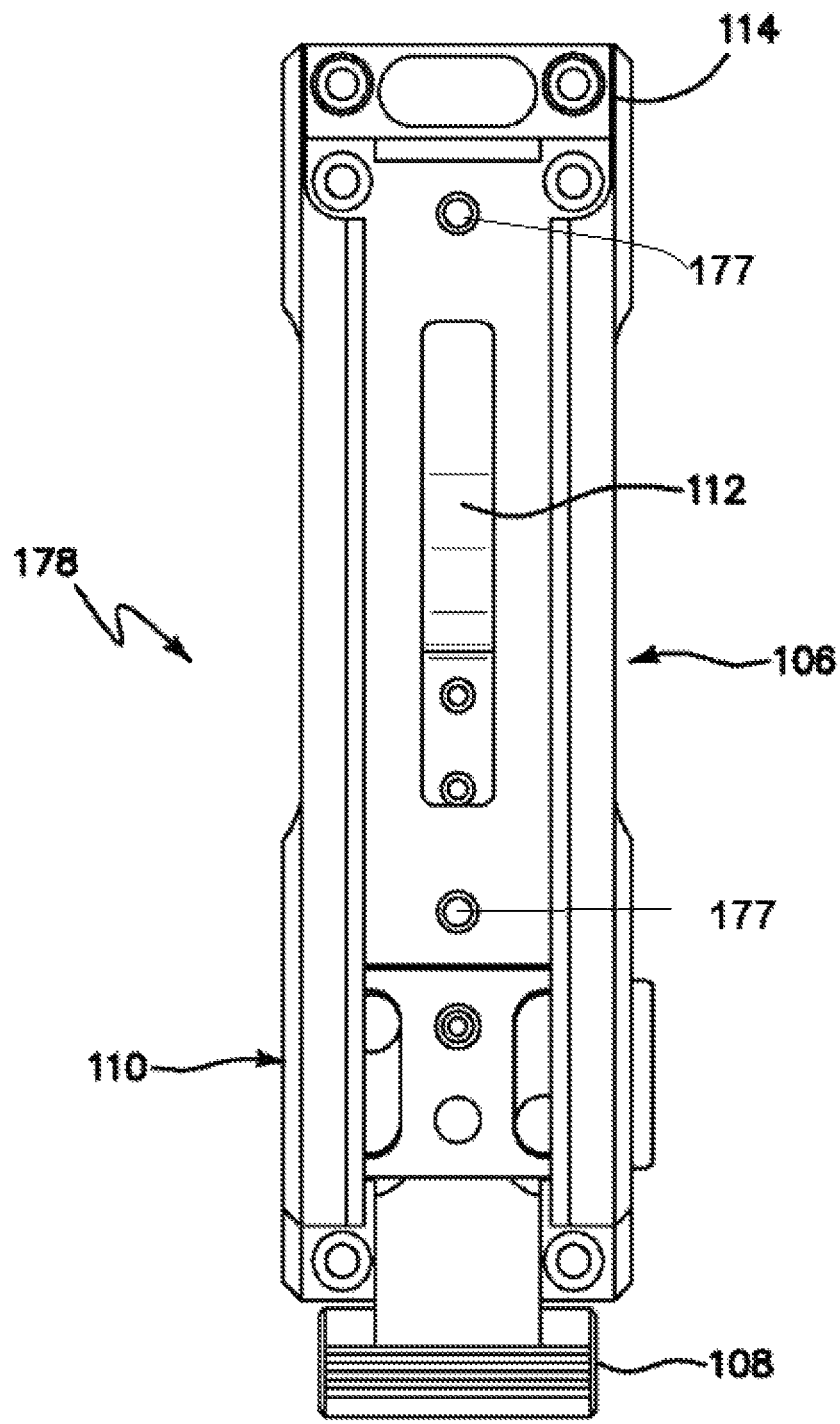
FIG. 11 is a top plan view of the T-slot channel defined in the handle shown in FIG. 9.
Figure 12:
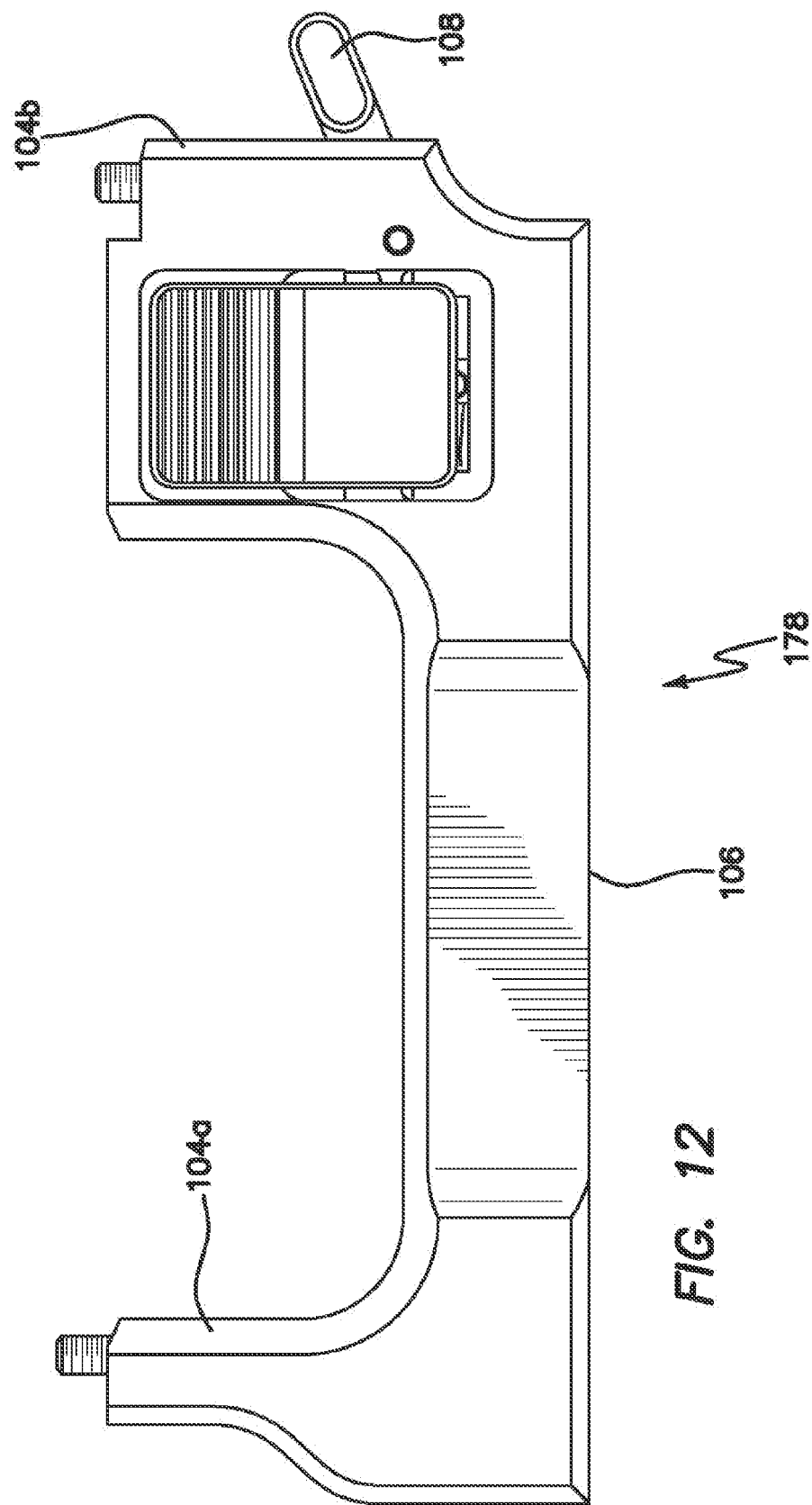
FIG. 12 is a side plan view of the handle shown in FIG. 9 showing the rocker latch and latch lever.
Figure 13:
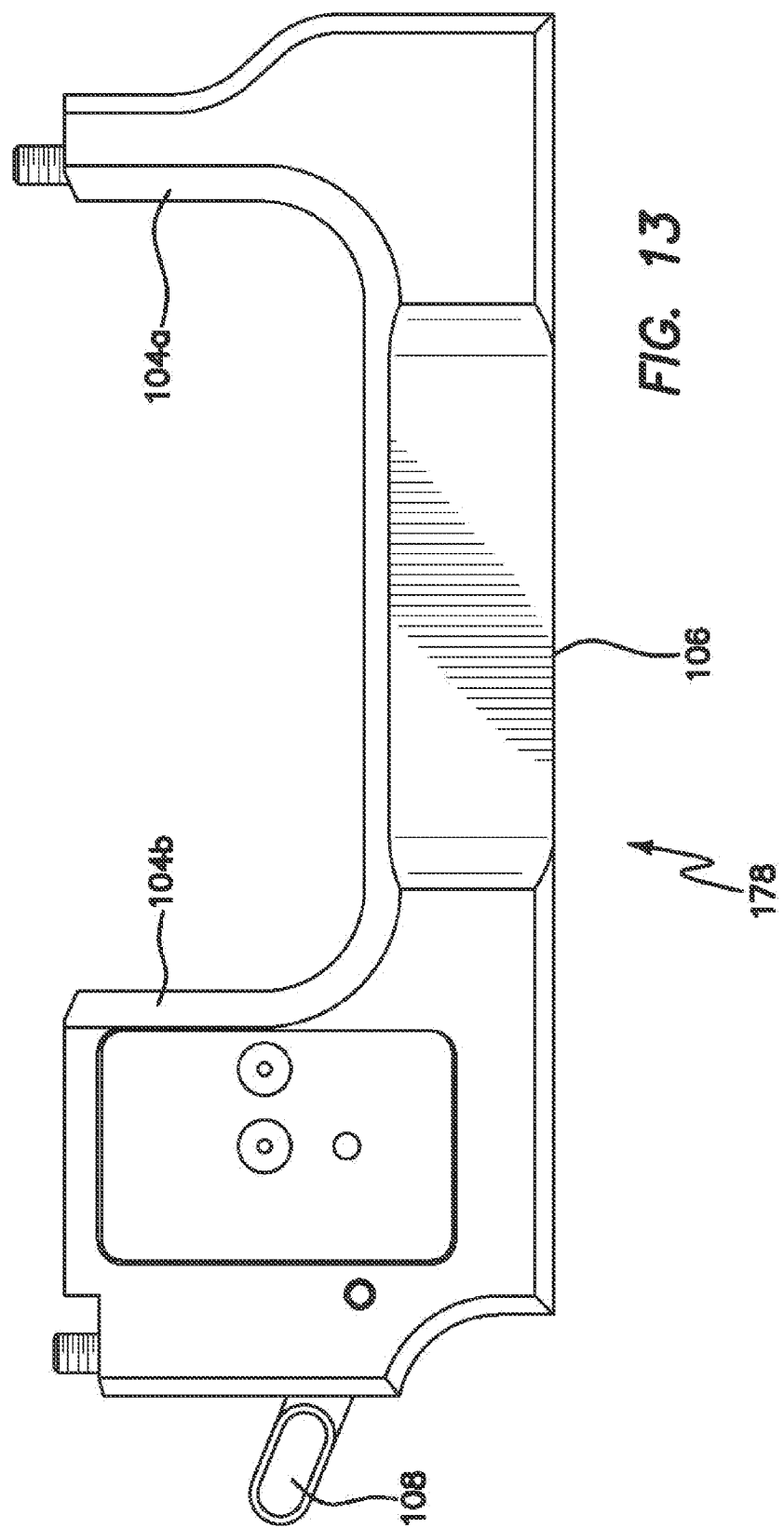
FIG. 13 is a side plan view of the handle of the opposite side to that shown in FIG. 12.
Figure 17:
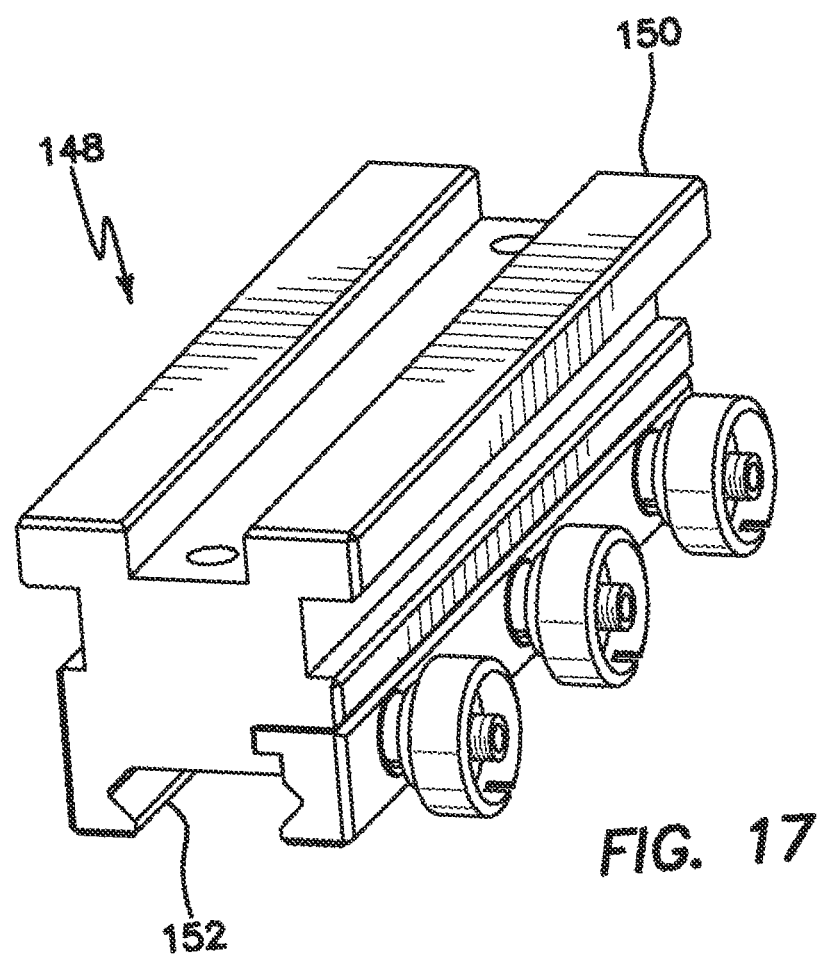
FIG. 17 is a perspective view of a T-slot to Picatinny adapter according to the illustrated embodiments of the invention.
Figure 18:
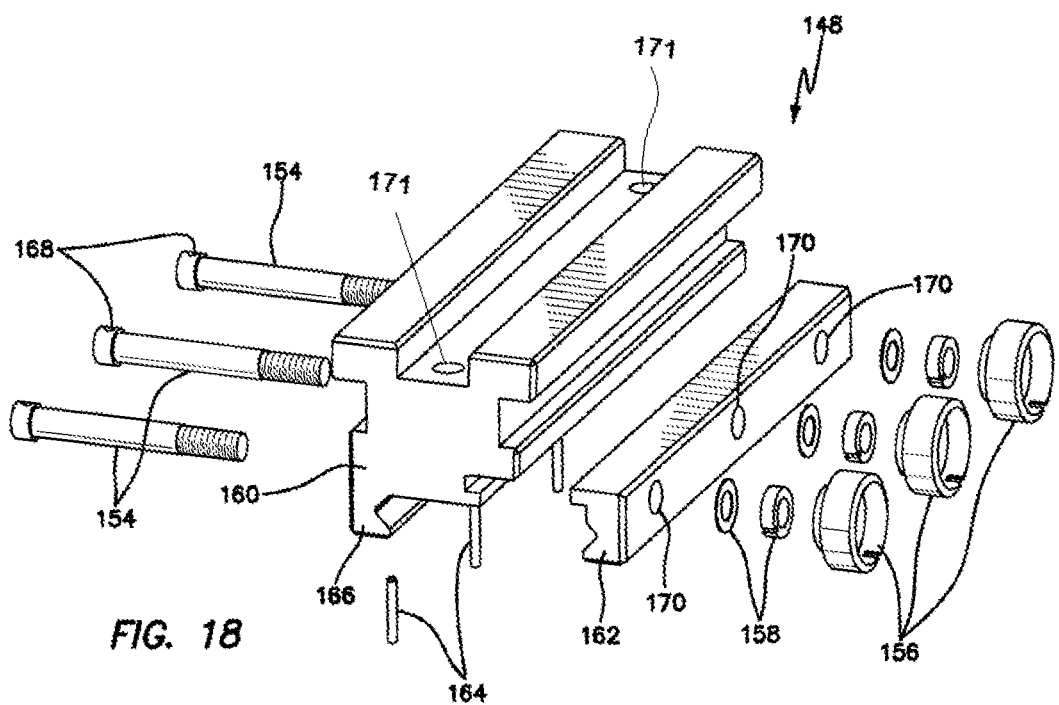
FIG. 18 is an exploded perspective view of a T-slot to Picatinny adapter according to the illustrated embodiments of the invention.
Figure 19:
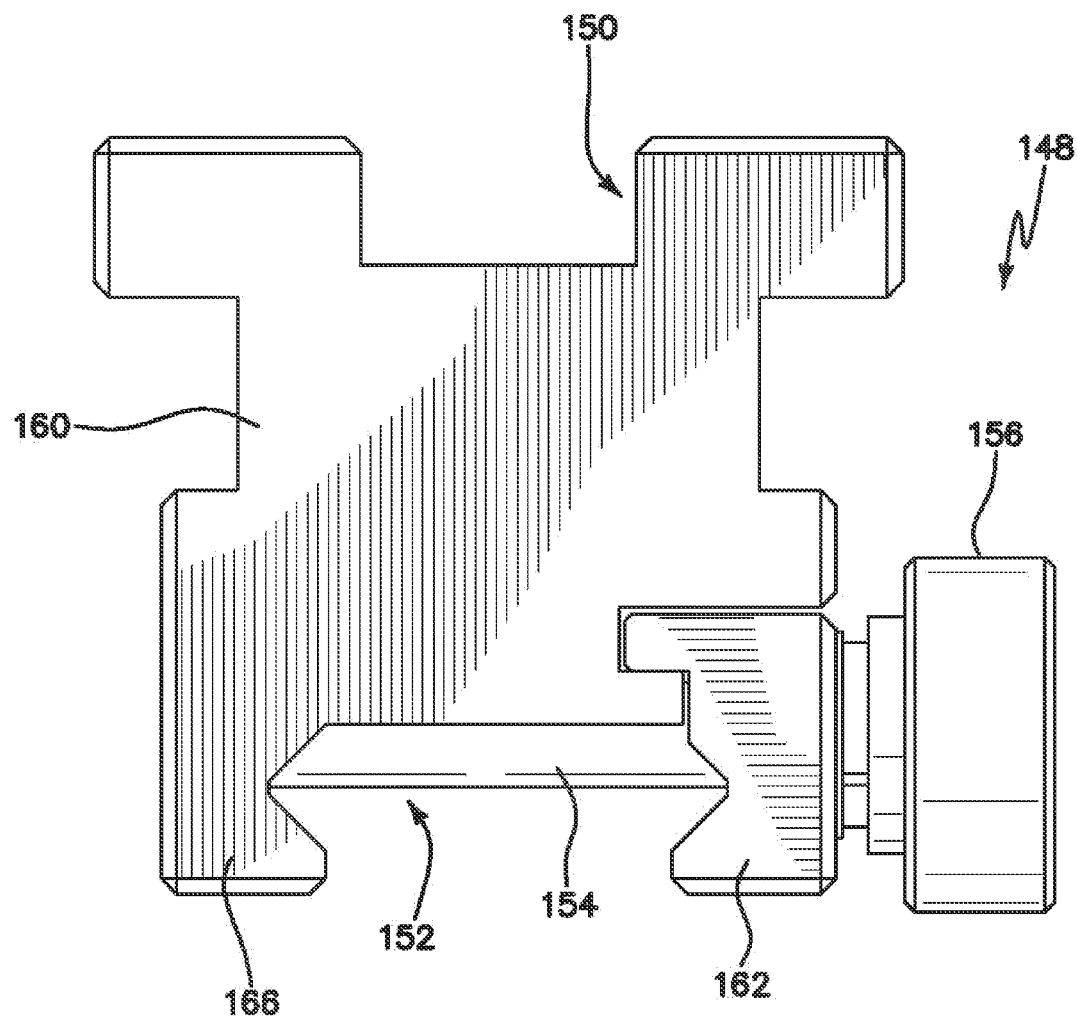
FIG. 19 is an end plan view of a T-slot to Picatinny adapter according to the illustrated embodiments of the invention.
Figure 20:
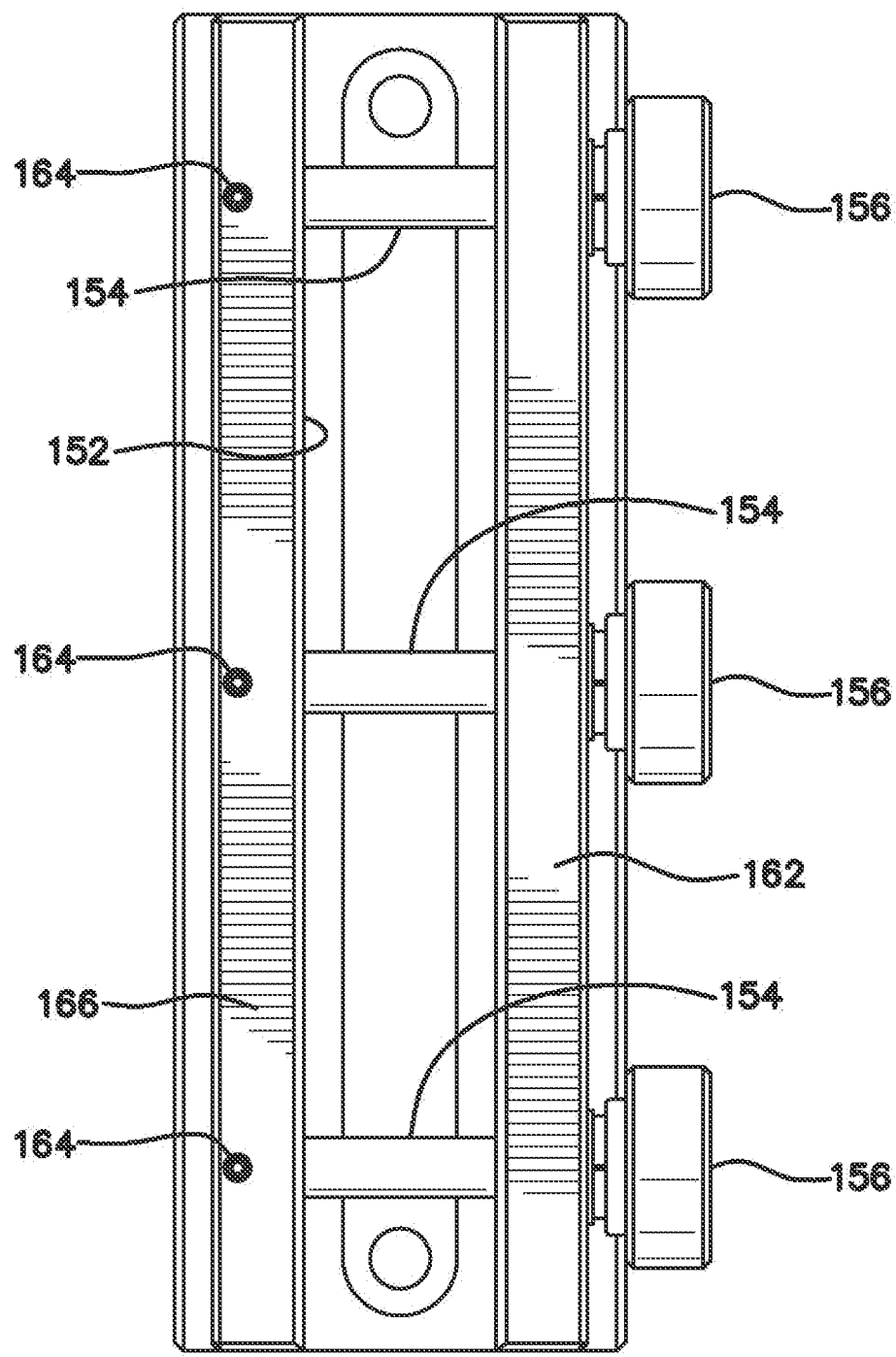
FIG. 20 is a top plan view of a T-slot to Picatinny adapter according to the illustrated embodiments of the invention.

Handle 178 is better understood by viewing the exploded perspective view of FIG. 10 showing the bottom or hand grip surface of handle 178 in combination with the assembled top plan view of FIG. 11, and the left and right side plan views of FIGS. 12 and 13. The view of FIG. 11 shows the T-bar engaging channel 106, which is best depicted in the perspective view of FIG. 9. A leaf spring 112 is attached to the floor of channel 106 and serves to provide resilient compression of the T-bar rail (not shown) when engaged by the mating T-bar engaging channel 106. The end of T-bar engaging channel 106 is terminated with a T-mount stop block 114, which is bolted on and cushioned by a T-slot bumper stop 116 best seen in FIG. 10, which slides at least partially into a receiving slot defined into T-mount stop block 114 as shown in the longitudinally cutaway perspective view of FIG. 14. Threaded bores 177 are defined into channel 106 to allow the slot-to-Picatinny adapter 148 of FIG. 17 to be bolted to channel 106.

Figure 15:
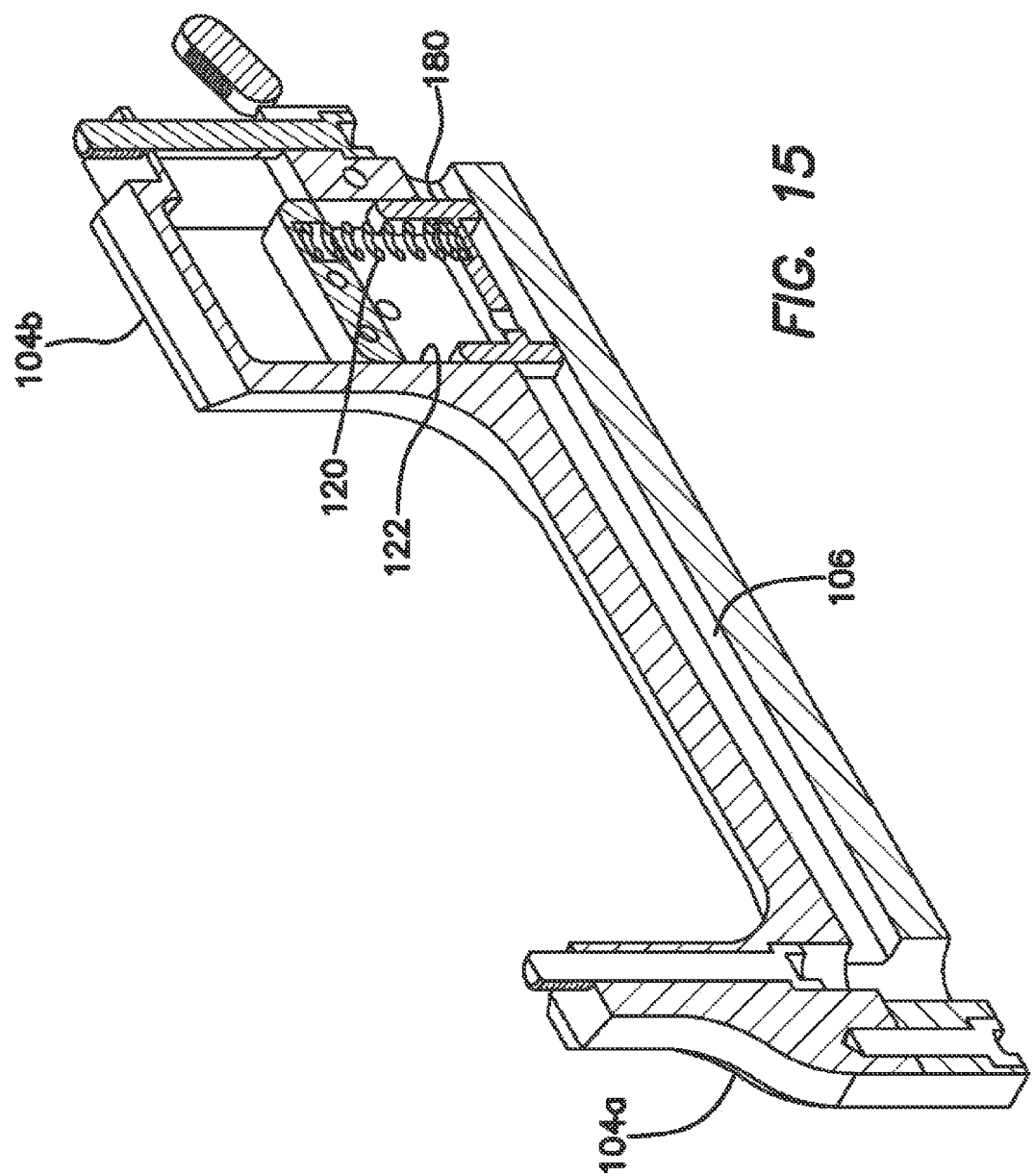
FIG. 15 is a longitudinal cutaway perspective view of the handle shown in FIG. 9 showing the latch block and one of its two biasing springs.

The locking mechanism of handle 178 is best understood by starting with the longitudinally cutaway perspective view of FIG. 15. Here it can be seen that spring biased latch block 118 can descend into the T-rail slot of channel 106 and capture any T-rail segment disposed between latch block 118 and stop block 114 on the other end of channel 106. Latch block 118 is carried by a pin 124 and can move upwardly and downwardly within space 122. FIG. 10 shows latch block 118 best and its two corresponding biasing springs 120 which seat in two corresponding cylindrical sockets defined into latch block 118.

Figure 14:
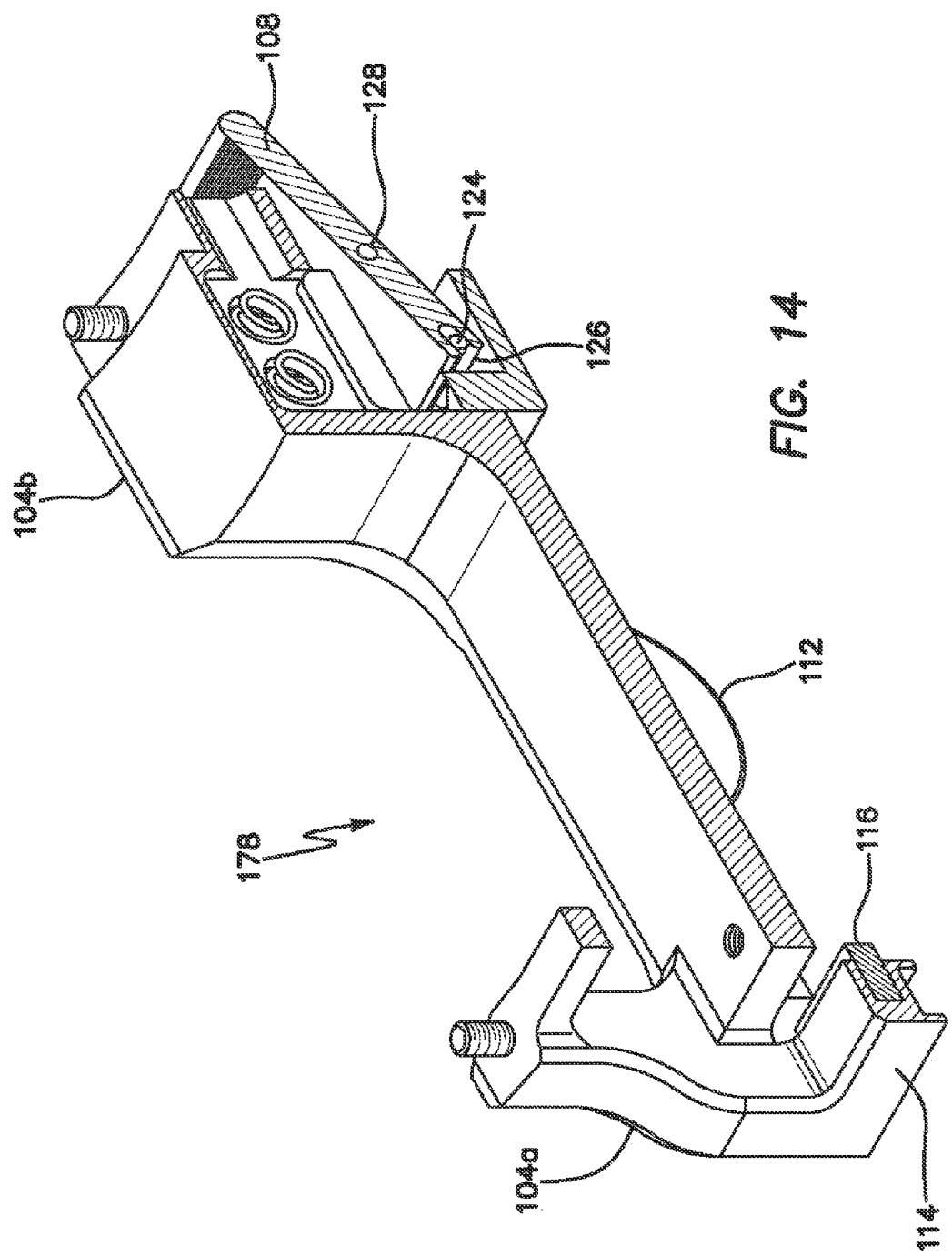
FIG. 14 is a longitudinal cutaway perspective view of the handle shown in FIG. 9 showing the connection of the latch lever to the latch block.
Figure 16:
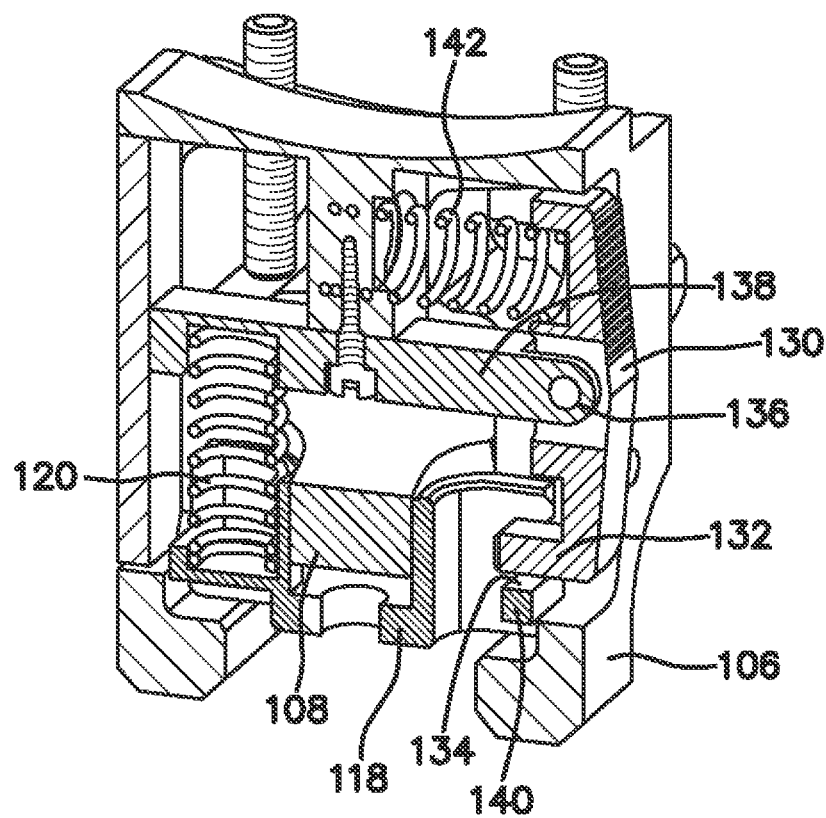
FIG. 16 is a perpendicular cutaway perspective view of one arm of the handle shown in FIG. 9 showing the latch block and one of its two biasing springs and the co-action of the rocker latch to lock the latch block in the up and down positions.

Pin 124 is slidingly captured within a fork 126 on the end of latch lever 108 as best seen in FIGS. 10 and 14. Latch lever 108 in turn rotates about pin 128 captured in arm 104b. Therefore, by moving latch lever 108, latch block 118 is moved upwardly and downwardly in space 122 into and out of the T-slot of channel 106. When in the down-position in which latch block 118 is fully inserted into the T-slot in channel 106, spring biased rocker latch 130 has a lower flange 132 which rotates above flange 140 of latch block 118 as best seen in the cross-sectional perspective view of FIG. 16 to lock latch block 118 in the down-position. Rocker latch is biased into the locked position by a pair of springs 141 seen in FIG. 10 and flange 132 which bears against surface 134 of flange 140 of latch block 118. Rocker latch 130 is pivoted on pin 136 which is carried by pivot plate 144, which in turn is fixed to arm 104b by a pair of bolts shown in FIGS. 10 and 16. Since pin 136 is carried by pivot plate 144, it can be located at a selected location within arm 104b. Therefore, pin 136 is position by pivot plate 144 so that the rotation axis for rocker latch 130 is inside space 122 thereby leaving less of rocker latch 130 exposed outside of arm 104b to provide increased physical protection to rocker latch 130 from damage and increased environmental protection from dirt/debris fouling from the environmental elements to which illuminator 10 is typically exposed in the battlefield. The opposing ends of pivot plate 144 define a pair of spring seats into which the upper ends of springs 120 are seated as shown in FIG. 16. Springs 120 are diagonally positioned with respect to each other in latch block 118. One spring 120 is seated into rear left seat 146a and the other spring 120 into front right seat 146b shown in FIG. 10 with corresponding opposing spring seats defined in the underside of pivot plate 144.

Similarly, when in the up-position in which latch block 118 is fully withdrawn from the T-slot in channel 106, lower flange 132 is first rotated outward to allow latch lever 108 to raise latch block 118 and then latch lever 130 is allowed to rotate back into the position shown in FIG. 16, but this time with flange 132 extending below flange 140 of latch block 118 to lock latch block 118 in the up-position.

T-Slot to Picatinny Adapter

FIGS. 17-20 illustrated an adapter 148 whereby the Sure-Fire T-rail fitting of handle 178 such as shown in FIG. 9 is adapted to fit a conventional Picatinny rail. Adapter 148 and its various components is best shown in the exploded perspective view of FIG. 18 and the perspective view of FIG. 17, where a SureFire proprietary T-slot 150 is defined on one surface, which would mount with the handle 178 of FIG. 9 and where a Picatinny rail coupling 152 is provided on the opposing surface of adapter 148. Adapter includes a body 160 and a movable or cammed rail 162 which is coupled to body 160 by means of three bolts 154 disposed through a fixed rail 166 of body 160 across the Picatinny rail coupling 152. Bolts 154 are fixed into position by three corresponding pins 164 press fit into bores defined in fixed rail 166 and seated into corresponding bores 168 defined in the heads of each of the bolts 154 as best seen in exploded view FIG. 18 and as installed in FIG. 20. Bolts 154 extend across Picatinny rail coupling 152 into bores 170 defined in cammed rail 162. Rail 162 is temporarily fastened to body 160 opposing fixed rail 166 by means of washers 158 and tightening nuts 156 on the threaded end of each bolt 154 as seen in the bottom plan view in FIG. 20 and in side plan view in FIG. 19. Nuts 156 are shown as slotted cylinders, but hexagonally shaped cylinders or any other shape could be substituted. Adapter 148 can thus be placed onto a conventional Picatinny rail from the side while cammed rail 162 is loosely retained on bolts 154, bolts 154 laid across the toothed channel of the conventional Picatinny rail, movable rail 162 adjusted to the outside of the conventional Picatinny rail and then nuts 156 tightened to lock and clamp rail 162 onto the conventional Picatinny rail. Bores 171 are provided for through bolts which can be used to fix adapter 148 securely as a hard mount.

Remote Controller Handle

Figure 21:
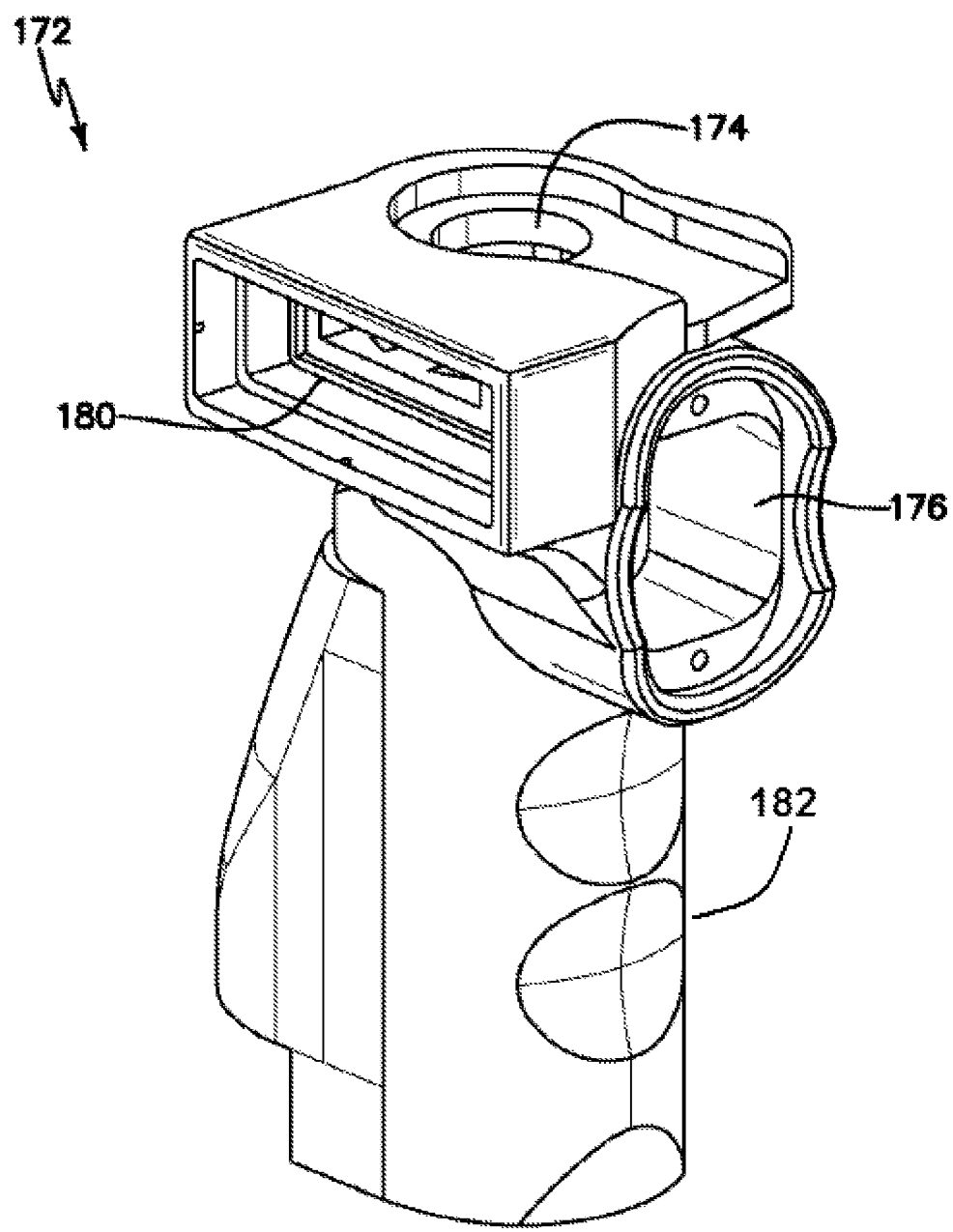
FIG. 21 is a perspective view of a body of a remote control handle according to the illustrated embodiments of the invention.

Another improvement of the illustrated embodiments of the invention is shown in perspective view in FIG. 21 where the body 172 of a remote controller handle is shown. In the previously sold versions of the Hellfighter illuminator as shown in FIG. 1, a remote controller handle is coupled to the gun handle at the rear of the gun from where it is normally aimed and operated. A main on/off switch was provided on the prior controller handle, which turned the illuminator on or off. For momentary light activation, the user partially depressed a handgrip assembly pushbutton. For constant light activation, the user clicked the handgrip assembly pushbutton. No other controls were included.

Body 172 of the remote controller handle in FIG. 21 includes the ergonomic hand grip 182 and the main off/on switch and handgrip assembly pushbutton in mounting positions 174 and 176 as before, but also includes a cavity 180 in which a plurality of sealed pushbutton switches for additional light functions can be mounted. In the illustrated embodiment four sealed pushbutton switches (not shown) are mounted in cavity 180 which allow one-hand, finger activation of selected ones of the plurality of momentary and/or click pushbutton switches to control zoom out, zoom in, electronic IR filter control and other light and filter control commands as may be desired.

Body 172 of the remote controller handle in FIG. 21 is molded of a single piece of high impact plastic and incorporates a hollow interior through which the electrical leads to the mounted switches are included and a main cylindrical body bore which allows slip fitting body 172 onto the gun handle.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

For example, FIGS. 2, 29 and 30 illustrate three embodiments whereby the IR filter may be utilized in the claimed combination. However, it must be understood that these embodiments by no means exhaust the number of ways in which the IR filter may be selectively deployed with respect to the light source and that many other possibilities are regarded as being within the scope and spirit of the invention.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

I claim:

1. An internal IR filter assembly for an illuminator having a lamp disposed within a reflector with a face plate comprising:
    a spring-biased IR filter shaped as a hollow sleeve telescopically disposed over the lamp;
    a fixed cylindrical pedestal having one end coupled to the face plate;
    a sliding cylindrical mount coupled to the IR filter and telescopically disposed over the fixed pedestal;
    a gear drive;
    a driven gear engaged with the gear drive;
    a motor coupled to the gear drive to selectively and reversibly rotate the gear drive, the driven gear being coupled to the sliding cylindrical mount of the IR filter to selectively and reversibly translate the IR filter with respect to the lamp; and
    at least one rod coupled to the driven gear to prevent the rotation of the driven gear, the at least one rod being slidable within the illuminator but rotationally fixed relative to the illuminator.

2. The internal IR filter assembly of claim 1 further comprising a plurality of rods coupled to the driven gear to prevent the rotation of the driven gear, each of the rods being slidable within the illuminator but rotationally fixed relative to the illuminator.

3. The internal IR filter assembly of claim 2 where a tripod of rods is coupled to the driven gear to prevent the rotation of the driven gear.

4. The internal IR filter assembly of claim 3 where the driven gear has a front disposed toward the reflector and a rear disposed away from the reflector and where the tripod of rods is coupled to the cylindrical mount coupled to the IR filter.

5. The internal IR filter assembly of claim 4 where the tripod of rods is disposed through the reflector and where the tripod of rods is coupled to the front of the driven gear to prevent rotation of the driven gear.

6. The internal IR filter assembly of claim 2 where the driven gear has a front and a rear, and where the plurality of rods include a first tripod of rods coupled to the rear of the driven gear to prevent the rotation of the driven gear.

7. The internal IR filter assembly of claim 6 further comprising a second tripod of rods coupled to the front of the driven gear.

8. The internal IR filter assembly of claim 7 where the front of the driven gear is disposed toward the reflector, where the rear of the driven gear is disposed away from the reflector, and where the second tripod of rods is coupled to the cylindrical mount coupled to the IR filter.

9. The internal IR filter assembly of claim 8 where the second tripod of rods is disposed through corresponding holes defined in the reflector without contacting the reflector.

10. The internal IR filter assembly of claim 8 where the second tripod of rods is disposed through corresponding holes defined in the reflector with sliding contact with the reflector to prevent rotation of the driven gear.

11. The internal IR filter assembly of claim 7 where the first and second tripods of rods are angularly offset from each other with respect to their coupling to the driven gear.

12. A drive system for an internal IR filter assembly in an illuminator comprising:
    a gear drive;
    a driven gear engaged with the gear drive;
    a motor coupled to the gear drive to selectively and reversibly rotate the gear drive, the driven gear being coupled to the sliding cylindrical mount of the IR filter to selectively and reversibly translate the IR filter within the illuminator; and
    at least one rod coupled to the driven gear to prevent the rotation of the driven gear, the at least one rod being slidable within the illuminator but rotationally fixed relative to the illuminator.

13. The drive system of claim 12 further comprising a plurality of rods coupled to the driven gear to prevent the rotation of the driven gear, each of the rods being slidable within the illuminator but rotationally fixed relative to the illuminator.

14. The drive system of claim 13 where a tripod of rods is coupled to the driven gear to prevent the rotation of the driven gear.

15. The drive system of claim 14 further comprising a reflector, where the driven gear has a front disposed toward the reflector and a rear disposed away from the reflector and where the tripod of rods is coupled to the cylindrical mount coupled to the IR filter.

16. The internal IR filter assembly of claim 15 where the tripod of rods is disposed through the reflector and where the tripod of rods is coupled to the front of the driven gear to prevent rotation of the driven gear.

17. The internal IR filter assembly of claim 13 where the driven gear has a front and a rear, and where the plurality of rods include a first tripod of rods coupled to the rear of the driven gear to prevent the rotation of the driven gear.

18. The internal IR filter assembly of claim 17 further comprising a second tripod of rods coupled to the front of the driven gear.

19. The internal IR filter assembly of claim 18 further comprising a reflector, where the front of the driven gear is disposed toward the reflector, where the rear of the driven gear is disposed away from the reflector, and where the second tripod of rods is coupled to the cylindrical mount coupled to the IR filter.

20. The internal IR filter assembly of claim 19 where the second tripod of rods is disposed through corresponding holes defined in the reflector without contacting the reflector.

21. The internal IR filter assembly of claim 19 where the second tripod of rods is disposed through corresponding holes defined in the reflector with sliding contact with the reflector to prevent rotation of the driven gear.

22. The internal IR filter assembly of claim 18 where the first and second tripods of rods are angularly offset from each other with respect to their coupling to the driven gear.

\* \* \* \* \*